US011105885B2

(12) United States Patent
Shah

(10) Patent No.: US 11,105,885 B2
(45) Date of Patent: Aug. 31, 2021

(54) SYSTEM AND METHODS FOR IDENTIFYING THE LOCATION OF A DEVICE BASED ON CALIBRATION INFORMATION

(71) Applicant: Yogendra C Shah, Exton, PA (US)

(72) Inventor: Yogendra C Shah, Exton, PA (US)

(*) Notice: Subject to any disclaimer, the term of this patent is extended or adjusted under 35 U.S.C. 154(b) by 407 days.

(21) Appl. No.: 14/820,076

(22) Filed: Aug. 6, 2015

(65) Prior Publication Data
US 2016/0040902 A1 Feb. 11, 2016

Related U.S. Application Data

(60) Provisional application No. 62/033,646, filed on Aug. 6, 2014, provisional application No. 62/102,099, filed
(Continued)

(51) Int. Cl.
*G01S 5/02* (2010.01)
*H04W 4/029* (2018.01)
(Continued)

(52) U.S. Cl.
CPC ............. *G01S 5/021* (2013.01); *F24F 11/30* (2018.01); *F24F 11/62* (2018.01); *G01S 5/0284* (2013.01);
(Continued)

(58) Field of Classification Search
CPC ................. F24F 11/0034; F24F 11/006; F24F 2011/0035–0036; F24F 2011/0067; F24F 2011/0075; F24F 2120/10–12; F24F 11/30; F24F 11/46; F24F 11/62; G05B 15/02; G05B 2219/163; G05B 2219/25011; G05B 2219/25168; G05B 2219/2614;
(Continued)

(56) References Cited

U.S. PATENT DOCUMENTS 5,920,278 A * 7/1999 Tyler .......................... G01S 5/14
342/140
6,799,047 B1 * 9/2004 Bahl ..................... G01C 21/206
455/456.1

(Continued)

FOREIGN PATENT DOCUMENTS

EP 1756613 B1 * 4/2013 ........... G01S 5/0036

OTHER PUBLICATIONS

Machine Translation of EP 1756613, WIPO [online], 2018 [retrieved Nov. 26, 2018], Retrieved from Internet: <URL: https://patentscope.wipo.int/search/en/detail.jsf?docId=EP14687438&tab=PCTDESCRIPTION&maxRec=1000>, pp. 1-5.*

*Primary Examiner* — Todd Aguilera

(57) ABSTRACT

An occupancy detector provides for an automated means of detecting the location of an occupant. Methods to determine with a high degree of certainty if a user is at (or occupying) a specific physical location or region are provided, using a wide variety of radio signaling technologies readily available on a wide scale due to the prevalence of wireless radio communications systems. The occupancy detector may be used to deliver a variety of services from targeted advertising in a supermarket to home automation systems. An example of a system for controlling the climate in a dwelling comprising multiple zones representing small areas such as for example rooms is described using the occupancy detection algorithms.

17 Claims, 8 Drawing Sheets

Related U.S. Application Data on Jan. 12, 2015, provisional application No. 62/107,442, filed on Jan. 25, 2015.

(51) Int. Cl.
| | |
|---|---|
| *G01S 11/06* | (2006.01) |
| *H04W 4/38* | (2018.01) |
| *H04W 4/02* | (2018.01) |
| *G05B 15/02* | (2006.01) |
| *F24F 11/62* | (2018.01) |
| *F24F 11/30* | (2018.01) |
| *F24F 11/46* | (2018.01) |
| *F24F 120/10* | (2018.01) |

(52) U.S. Cl.
CPC ............ *G01S 11/06* (2013.01); *G05B 15/02* (2013.01); *H04W 4/02* (2013.01); *H04W 4/029* (2018.02); *H04W 4/38* (2018.02); *F24F 11/46* (2018.01); *F24F 2120/10* (2018.01); *G05B 2219/2642* (2013.01)

(58) Field of Classification Search
CPC .... G05B 2219/2642; G05B 2219/2648; G01S 5/00–30; G01S 2013/466–468; G01S 11/06; H04W 4/006; H04W 3/02–043; H04W 3/38; H04W 4/02–043; H04W 4/38; H04W 4/33
USPC ............... 700/276–278; 342/458; 455/456.1
See application file for complete search history.

(56) References Cited

U.S. PATENT DOCUMENTS

| | | | | |
|---|---|---|---|---|
| 6,839,027 B2* | 1/2005 | Krumm | ............... | G01S 5/0252 342/465 |
| 7,038,584 B2* | 5/2006 | Carter | ............... | G01S 5/0036 340/539.13 |
| 7,242,947 B2* | 7/2007 | Niu | ............... | G01S 5/0289 455/404.2 |
| 7,286,833 B2* | 10/2007 | Friday | ............... | H04W 64/00 455/456.1 |
| 7,598,865 B2* | 10/2009 | Zhang | ............... | G01S 13/876 340/10.1 |
| 7,739,705 B2* | 6/2010 | Lee | ............... | H04H 60/31 725/10 |
| 7,751,829 B2* | 7/2010 | Masuoka | ............... | G01S 5/0294 455/41.2 |
| 8,774,830 B2* | 7/2014 | Ziskind | ............... | G06N 99/005 455/456.1 |
| 9,002,375 B1* | 4/2015 | Lerner | ............... | G06Q 30/0281 455/456.1 |
| 9,173,067 B2* | 10/2015 | Aggarwal | ............... | H04W 4/04 |
| 9,179,244 B2* | 11/2015 | Linde | ............... | H04W 4/021 |
| 9,483,934 B2* | 11/2016 | Kotlicki | ............... | G08C 17/02 |
| 9,625,561 B2* | 4/2017 | Jihoon | ............... | G01S 1/44 |
| 9,921,292 B2* | 3/2018 | Yang | ............... | H04W 64/00 |
| 2003/0146835 A1* | 8/2003 | Carter | ............... | G01S 5/0036 340/539.13 |
| 2004/0095276 A1* | 5/2004 | Krumm | ............... | G01S 5/0252 342/465 |
| 2005/0134456 A1* | 6/2005 | Niu | ............... | G01S 5/0289 340/539.23 |
| 2005/0136845 A1* | 6/2005 | Masuoka | ............... | G01S 1/68 455/67.14 |
| 2007/0109125 A1* | 5/2007 | Zhang | ............... | G01S 13/876 340/572.1 |
| 2007/0266395 A1* | 11/2007 | Lee | ............... | H04H 60/31 725/11 |
| 2013/0165143 A1* | 6/2013 | Ziskind | ............... | G06N 99/005 455/456.1 |
| 2014/0064116 A1* | 3/2014 | Linde | ............... | H04W 4/021 370/252 |
| 2014/0176310 A1* | 6/2014 | Kotlicki | ............... | G08C 17/02 340/12.5 |
| 2014/0320337 A1* | 10/2014 | Jihoon | ............... | G01S 1/12 342/351 |
| 2015/0080020 A1* | 3/2015 | Edge | ............... | G01S 5/0236 455/456.1 |
| 2015/0156611 A1* | 6/2015 | Aggarwal | ............... | H04W 4/04 455/456.1 |
| 2017/0108575 A1* | 4/2017 | Yang | ............... | H04W 64/00 |

* cited by examiner

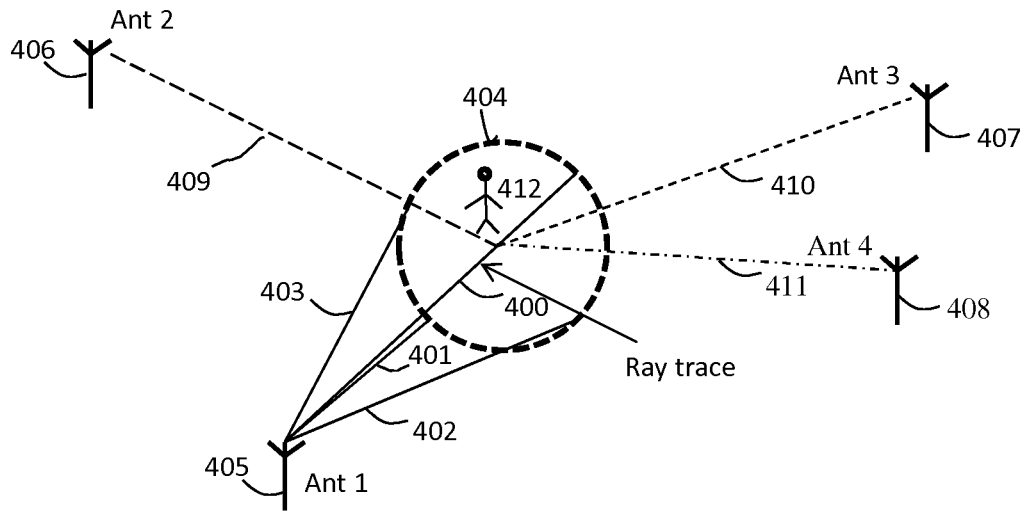
Figure 1: Ranging to Estimate Localized Occupancy
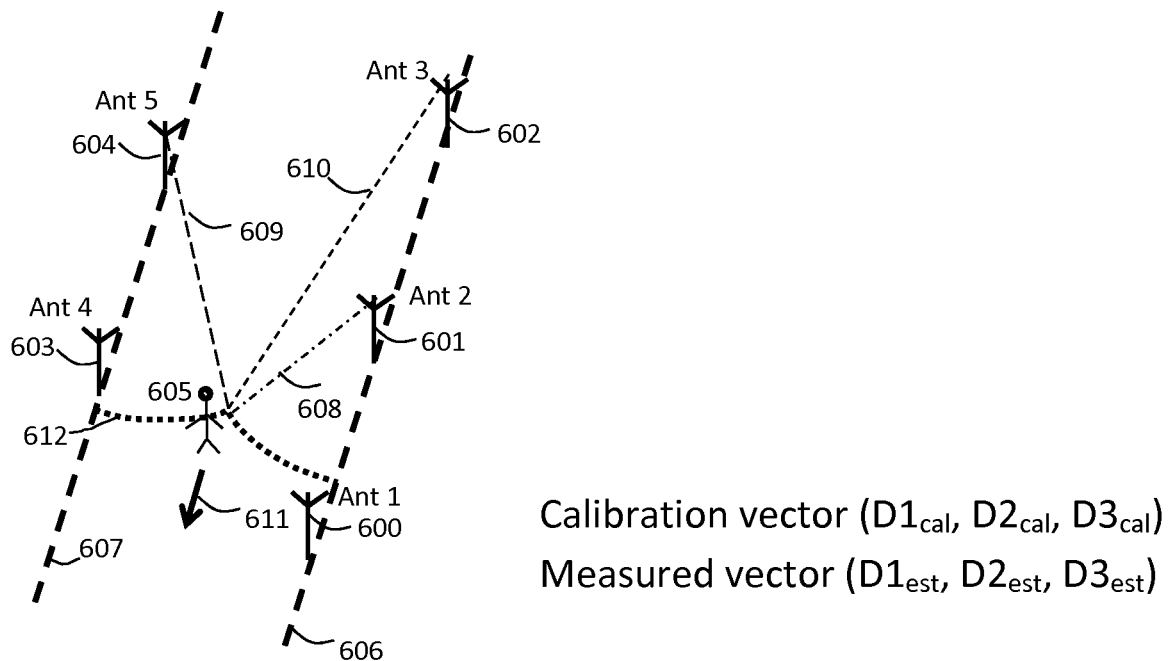
Calibration vector ($D1_{cal}$, $D2_{cal}$, $D3_{cal}$)
Measured vector ($D1_{est}$, $D2_{est}$, $D3_{est}$)
Figure 2: Ranging to Predict Occupancy along an Aisle

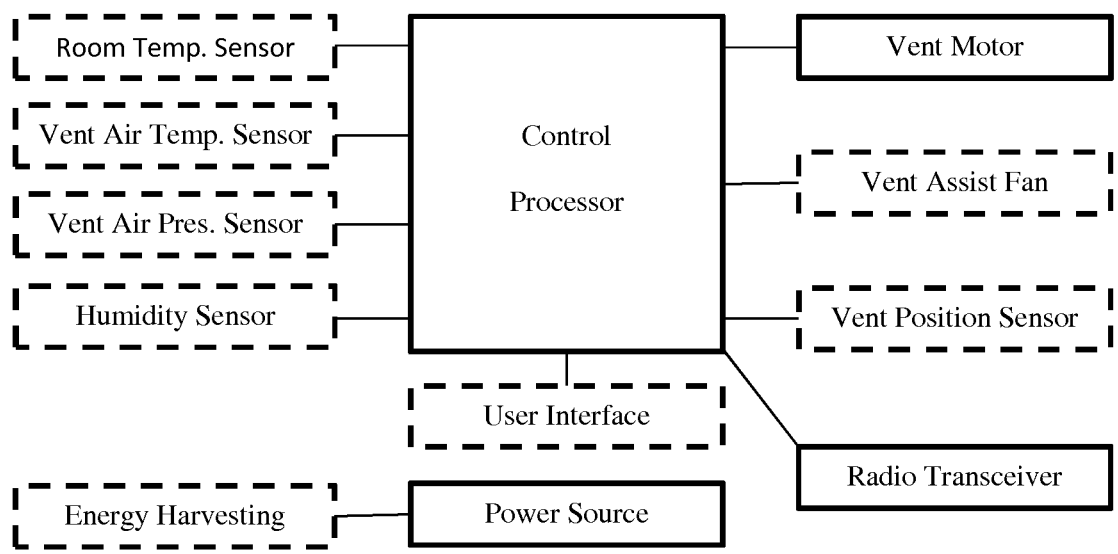
Figure 3: Motorized Register Vent System Architecture Components
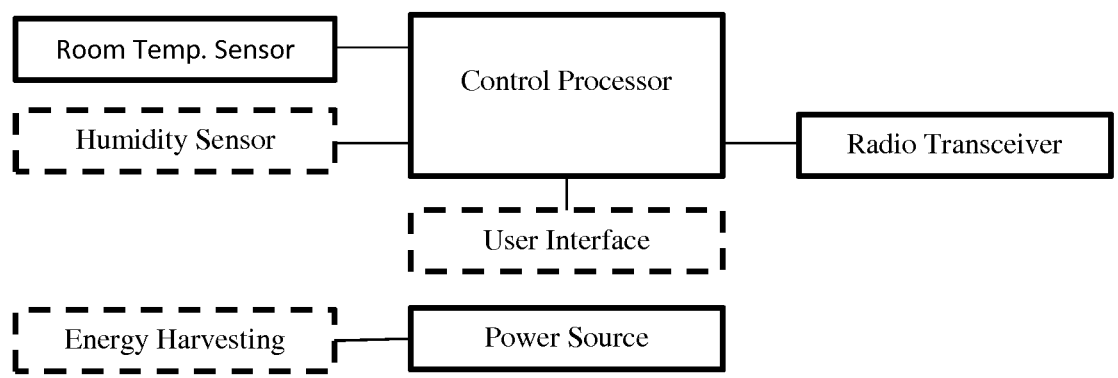
Figure 4: Remote Temperature Sensor Architecture Components

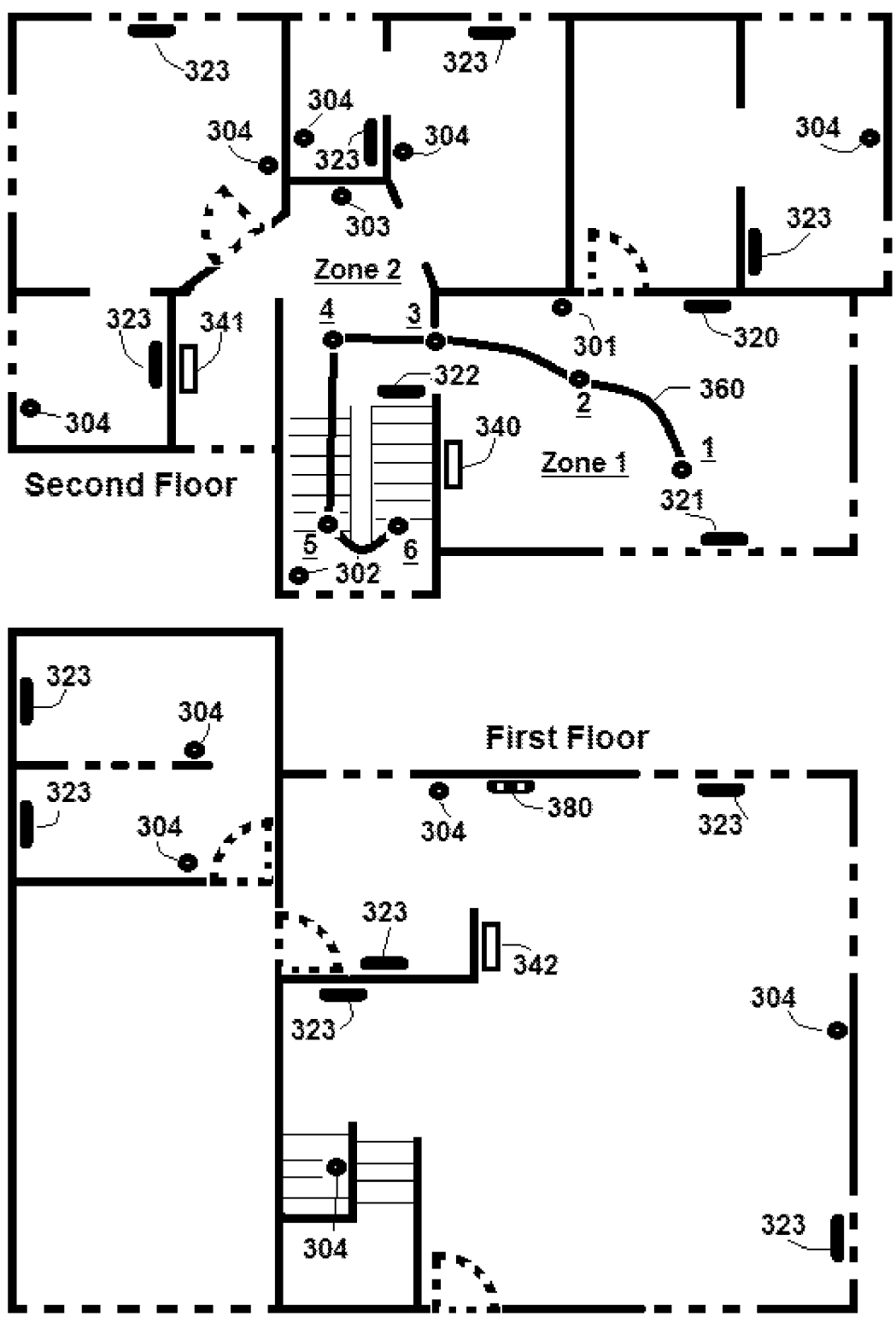
Figure 5: Dwelling Floor Layout Diagram

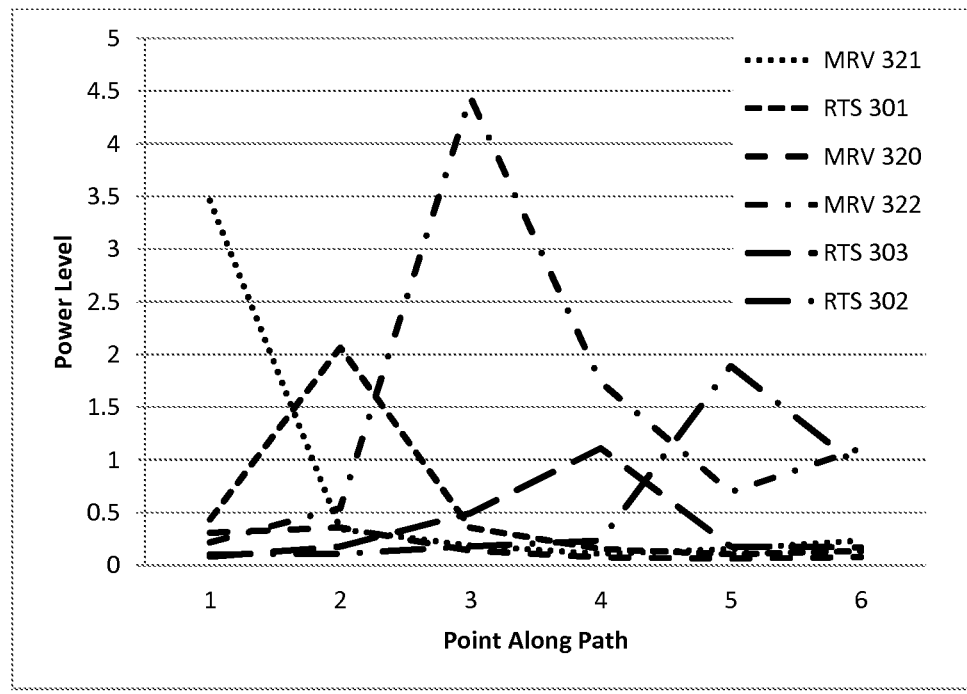
Figure 6: Plot of Power Received from Adjacent Zone Beacons
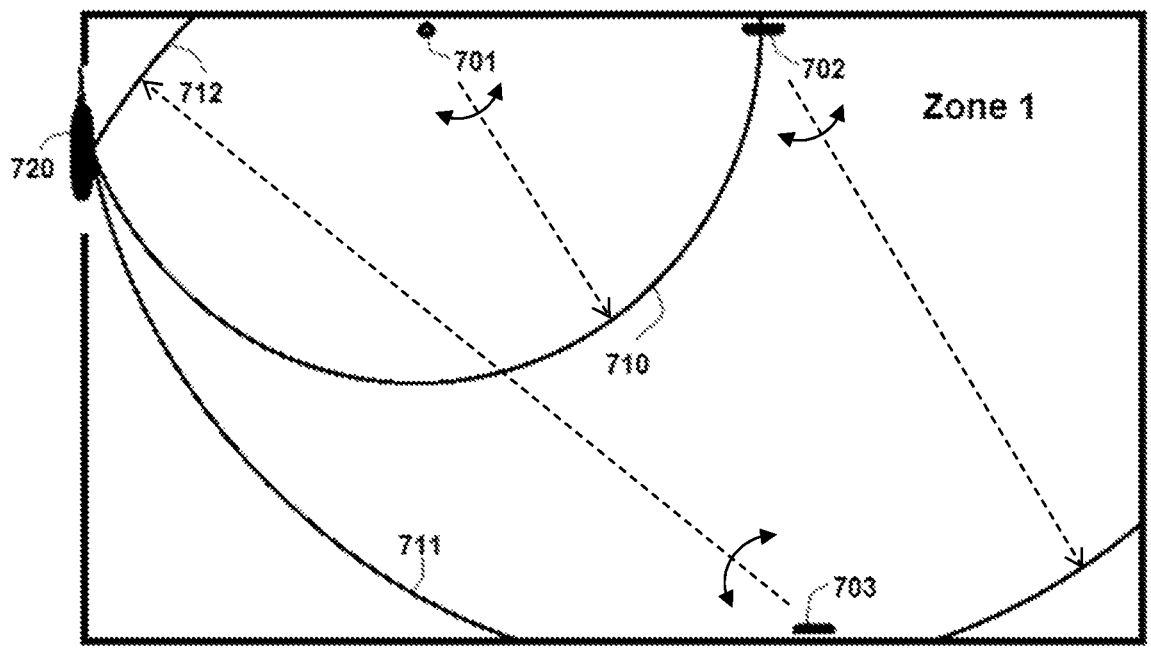
Figure 7: Plot of Space Covered by Spheres Centered on Beacons

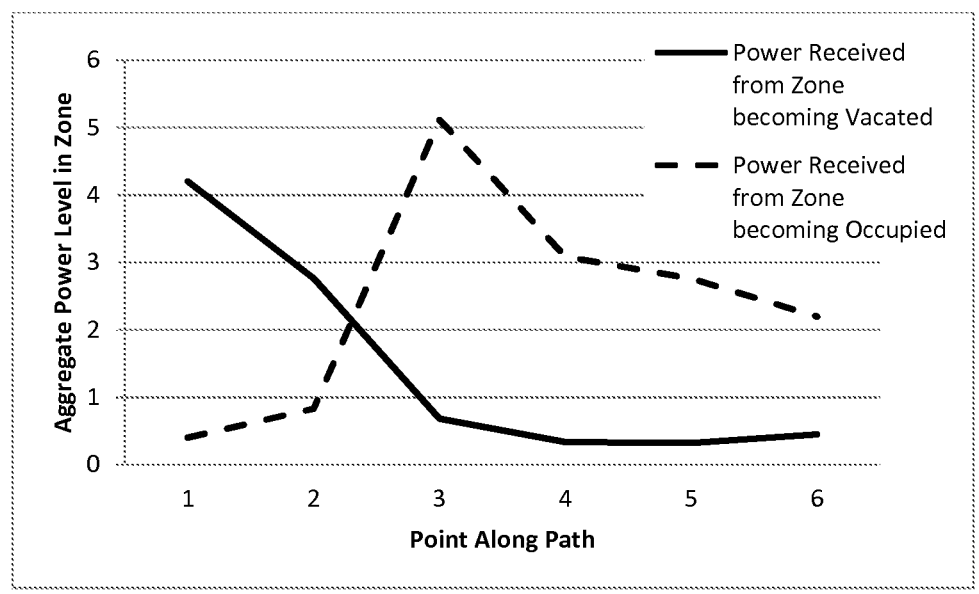
Figure 8: Plot of Aggregate Power Received from Adjacent Zone Beacons

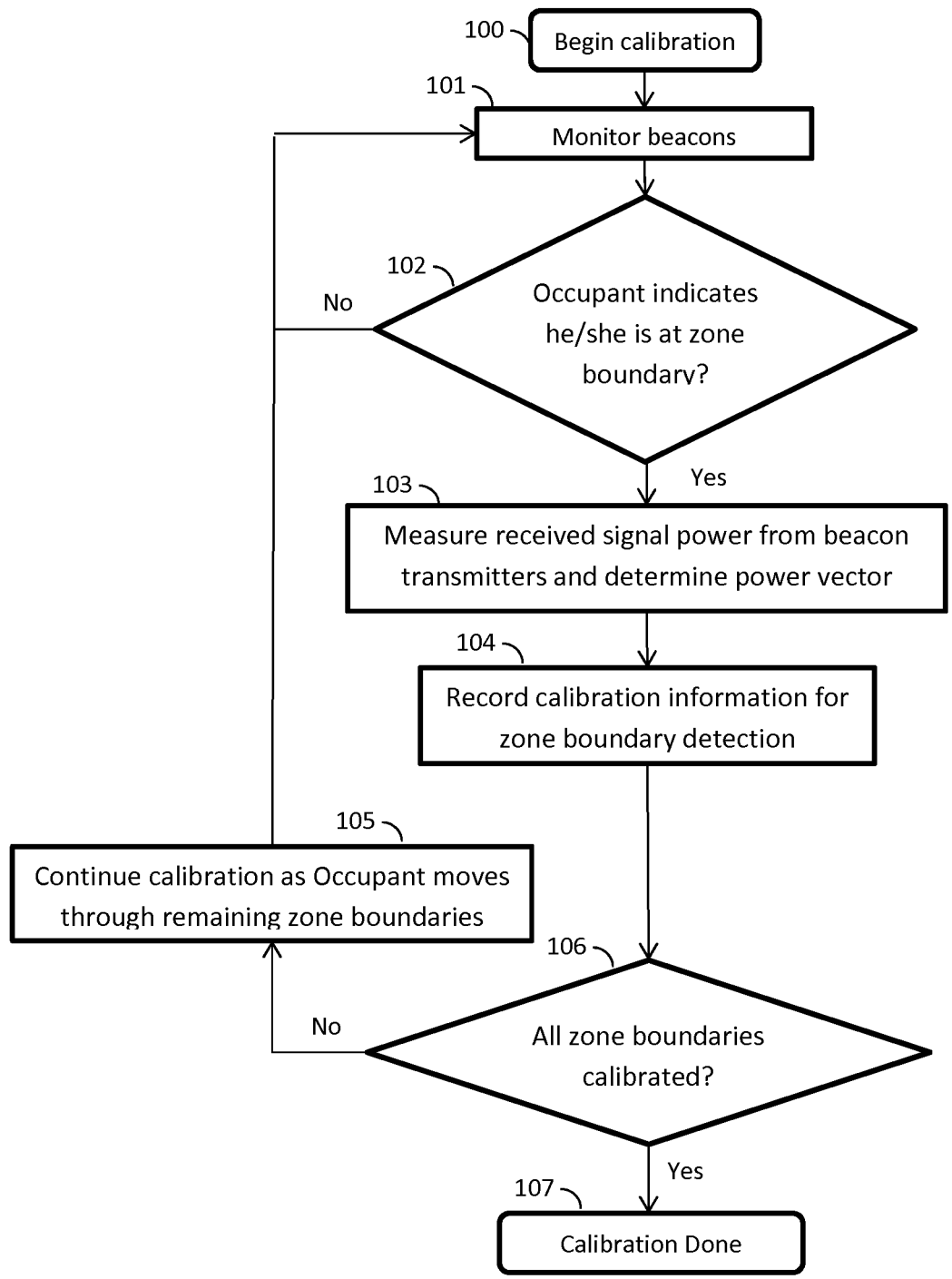
Figure 9: Calibration Logic for Occupant Movement between Zones

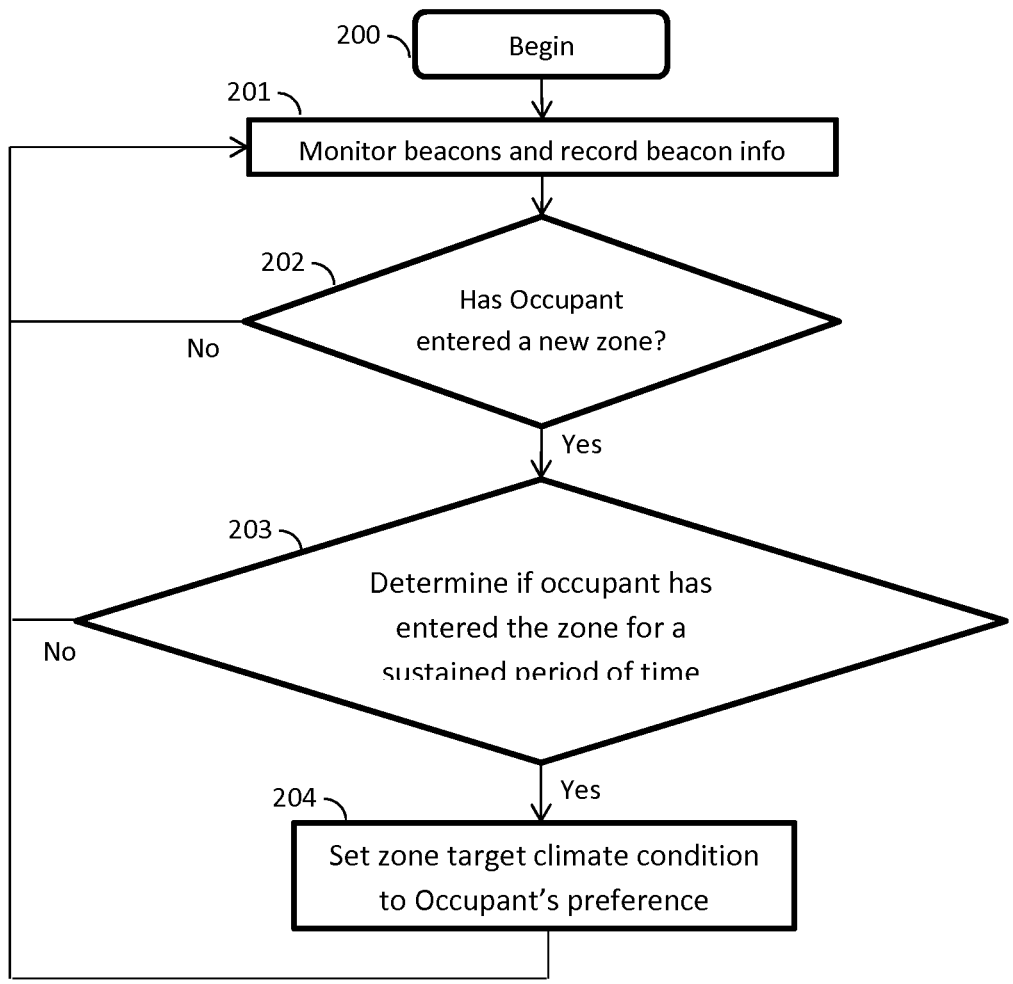
Figure 10: Occupancy Movement Detection between Zones

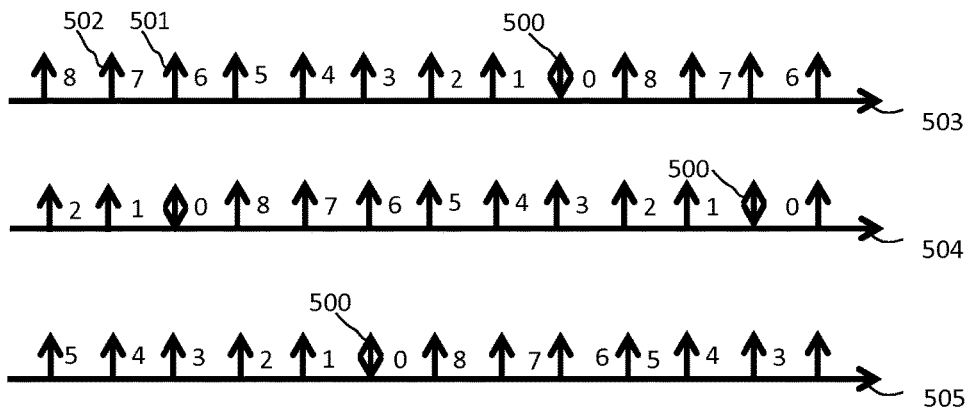
Figure 11: BLE Advertising and Listening Beacon Timing
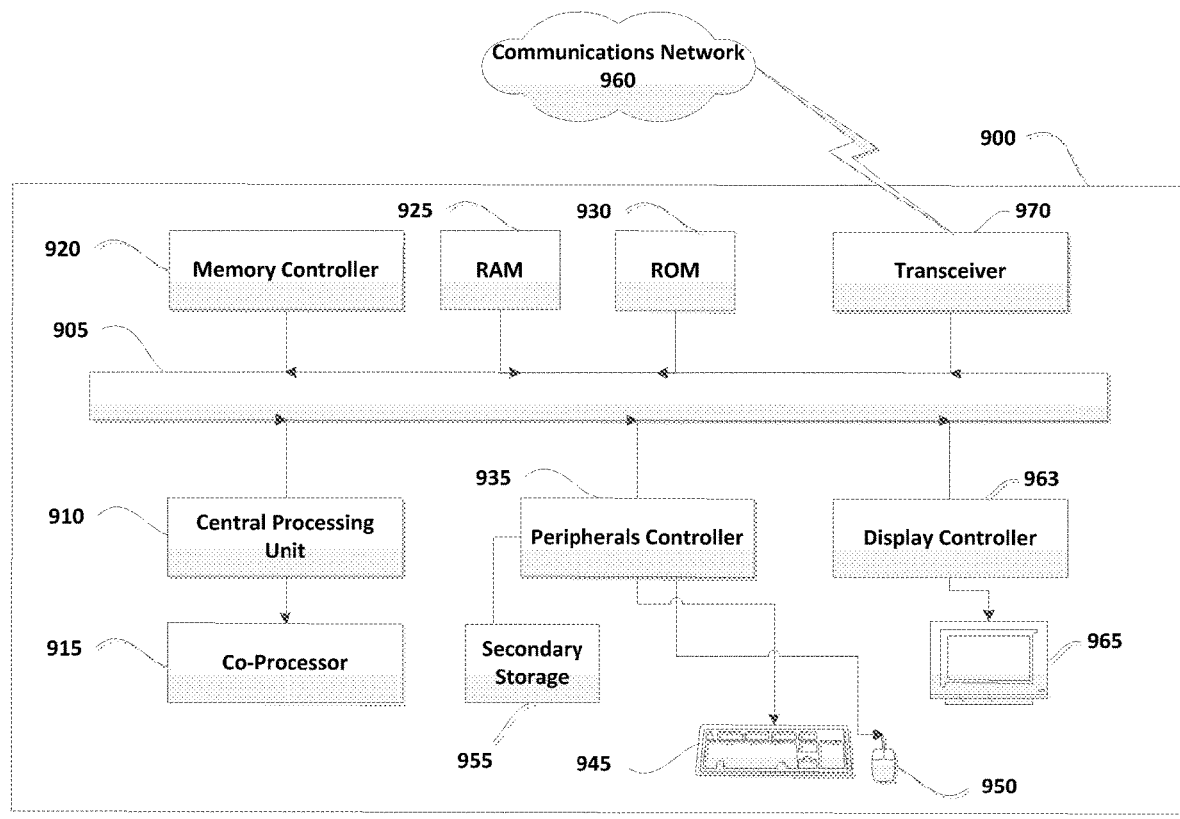
Figure 12: Exemplary Computing System

SYSTEM AND METHODS FOR IDENTIFYING THE LOCATION OF A DEVICE BASED ON CALIBRATION INFORMATION

CROSS-REFERENCE TO RELATED APPLICATIONS

This application claims the benefit of U.S. provisional patent application No. 62/033,646, filed Aug. 6, 2014, titled "Occupancy based Environment Control System," and no. 62/102,099, filed Jan. 12, 2015, and No. 62/107,442, filed Jan. 25, 2015, each of which is titled "Occupancy based Service Delivery System," and the disclosures of which are hereby incorporated by reference as if set forth herein in their entireties.

BACKGROUND

With the tremendous growth of the Internet and the availability of volumes of information on an on-demand basis, there has been a growth in the diversity and breadth of services and information available to consumers. In order to provide these services and data, in a tailored fashion and in a manner which is not intrusive or demanding on the user (a person or entity consuming a service or data), in terms of steps or actions a user may have to take to access the service, there needs to be a facility to filter and perform actions or decisions on behalf of users.

One type of service commonly provided to users—and which is used as an example herein—is climate control in a dwelling. Centrally controlled climate control systems are often used to establish a comfortable climate within a dwelling by controlling the flow of conditioned air within the dwelling. A dwelling may be a single family home, a multi-family unit such as an apartment, an office building, hotel or the like, which may be partitioned into zones, typically areas enclosed by walls such as rooms and hallways with entry and exit through doorways. A zone may comprise an enclosed area such as an individual room or a collection of rooms and/or hallway or a portion of a large open area. Air vents are often placed in strategic locations within each of the zones or rooms such as near windows and doors and connected to ducts, which push conditioned air into the room through duct work concealed between floors, ceilings, and walls. The duct work is typically interconnected through a web of duct pipes, which terminate at a heating and ventilation air conditioning (HVAC) system. Return air vents are also located at strategic locations throughout the dwelling, in the zones, and interconnected by way of a separate web of duct pipes also terminating at the HVAC system. These return air vents provide for a return path for the air from the various zones to be re-conditioned by the HVAC system and re-circulated back into the zones.

A central temperature sensor and control unit, referred to as a thermostat, is typically placed in a central location in the dwelling, to control the HVAC system operation. The thermostat incorporates a control unit which controls the operation of the HVAC system by turning it on or off or modulating it from fan only to low through high settings. In order to establish the climate within a dwelling at a comfortable level, the HVAC system may be configured to either cool the air or heat the air circulated through the ducts and into the zones. The air may be cooled during the summer when the air outside is warmer than the desired indoor climate and warmed during the winter when the air outside is cooler than the desired indoor climate. When the temperature measured by the thermostat is at the desired target temperature set on the thermostat, the HVAC system is turned off and when outside a specified dead zone or tolerance level from the desired climate target temperature, the HVAC system is turned on thereby helping to maintain a comfortable climate level within the dwelling.

The thermostat includes a facility to set the desired target temperature and heating vs. cooling function. The thermostat may also include a timer function to automatically turn the HVAC system on or off on a daily programmed schedule. These controls allow for setting the time when the overall system is to be turned on or off during a 24-hour period and daily or weekday/weekend settings on a weekly cycle, together with the desired environment temperature with each switch in operation mode. The thermostat enables the occupant of the dwelling to set times when the dwelling is likely to be unoccupied with the corresponding target temperature set to an unoccupied level, thus lowering the energy consumption, and set times when the dwelling is likely to be occupied with the corresponding target temperature set to a comfortable level. A temporary override switch may also be provided to override the timer function and manually turn on or off the system and/or modify the desired target temperature. Typically, the settings revert to the programmed settings at the next timer event when the timer-based automation resumes. Alternatively, the settings may be permanently set in hold mode until manually changed again by the occupant, for example when the occupant is on vacation, the target temperature may be set to a maintenance level thus ensuring the dwelling doesn't get too cold to for example freeze pipes or too hot to cause damage to furniture etc.

SUMMARY

Described herewith are methods and apparatus for performing occupancy detection, meaning identifying the location of a user or occupant and determining if the user is at (or occupying) a specific physical location. The location of a user or occupant is a very powerful attribute of a user that can be used to provide a form of customization and automation to user services. For example, if it is known that a user is entering his/her home, after arriving from work, then the decision to turn on a climate control system can be made without requesting input from the user. Similarly if a user is shopping in a supermarket and dwelling in the baked goods aisle then it can be inferred that the user is likely to pick up some bakery items. This user information may be used to provide coupons, product information or other targeted advertising.

The occupancy detection algorithms described herein aim to leverage radio signaling already available on a wide scale due to the wide availability of wireless radio communications systems. A radio receiver which may be in close proximity to a user or in the possession of a user may be used to detect radio signals from surrounding radio transmitters. The distance between a radio transmitter and receiver may be estimated from the received radio signals. Radio signals from multiple radios may be used to estimate distance vectors, which may in turn be used to determine the position of a user.

The occupancy detection algorithms may be utilized in a multitude of use case examples. In order to illustrate the algorithms, without restricting or limiting their use, an implementation for air quality climate control in a home automation system is described and illustrated here. The example implementation is designed to enable the climate within a dwelling to be controlled to the specific needs of the occupants while making efficient use of the energy required to condition the environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding of the specification may be had from the Detailed Description given below, by way of example, in conjunction with the accompanying drawings wherein like numerals indicate like elements throughout. In the drawings:

FIG. 1 is a diagram showing how localized occupancy detection may be determined.

FIG. 2 is a diagram illustrating how occupancy detection may be used to follow an individual along an aisle or passageway.

FIG. 3 is an architecture diagram for an example motorized register vent.

FIG. 4 is an architecture diagram for an example remote temperature sensor.

FIG. 5 is a diagram of an example dwelling with HVAC, register vents, temperature sensors, return vents and a central control unit.

FIG. 6 is a plot of an energy level profile for the various beacons received at a smartphone or wearable device as an occupant moves from one zone to another along the path shown in FIG. 5.

FIG. 7 is an example diagram for the outer circle of spheres centered at a beacon transmitter, of for example a MRV or RTS, and of radius equal to the distance from the beacon transmitter to an entrance/exit of a zone boundary. Zone 1 of FIG. 5 is shown as an example illustration.

FIG. 8 is a plot of an energy level profile aggregated for the various beacons, within one zone, at a smartphone or wearable device as an occupant moves from one zone to another along the path shown in FIG. 5.

FIG. 9 is a flow diagram illustrating one embodiment of a method for calibrating a climate control system (CCS) to sense when an occupant is leaving a zone and entering another zone.

FIG. 10 is a flow diagram illustrating one embodiment of a method for sensing when an occupant is leaving a zone and entering another zone and for performing adjustments to the CCS for a zone.

FIG. 11 is a diagram showing how a combination of transmit only beacons and transmit/receive beacons with sequence numbering that enables identification of the transmit/receive beacons to optimize discovery, synchronization, latency, two-way communications and power consumption.

FIG. 12 is a block diagram of an exemplary computing system in which aspects of the systems and methods described herein may be implemented or embodied.

DETAILED DESCRIPTION

The system and methods described here provide a means for establishing the location of a user; that is, determining if a user is occupying a specific location or physical region. The direct line of sight distances from an object, whose position is being estimated, to objects with known three-dimensional coordinates, provides sufficient information to uniquely determine the unknown object's position. The position of the unknown object may be determined through a process of triangulation. Typically, four distance measurements are sufficient to uniquely estimate the position of the unknown object provided all four known objects are not coplanar and three or more of the objects are not collinear. The need to have four distance measurements may be relaxed in situations where the unknown object may be constrained such as only placed along a line etc.

In order to illustrate the occupancy detection algorithms, an embodiment is described herein in which the algorithms are implemented in a home automation use case. The system and methods described herein for an occupancy based climate control system (CCS) provide for a means to establish a desired comfort level in an environment occupied by at least one occupant. A dwelling is partitioned into zones representing small areas, such as, for example, rooms. The control system follows an occupant of a dwelling as the occupant moves from one zone to another and maintains the occupied zone environment to the desired comfort level, which may include a desired temperature, humidity and lighting condition. The system can also cater to the common desired comfort level for multiple occupants of a zone. The control mechanisms described provide an optimal means of climate control and achieve a desired level of comfort with efficient use of energy. The occupancy sensors described herein provide a means of following occupants of a dwelling as they move from one zone to another and provide climate control in those zones that are occupied. Additionally, further energy conservation and efficiency may be achieved by transferring conditioned air from unoccupied zones to those that are occupied.

In one embodiment, the occupancy detection system may determine that an occupant is entering a zone and that the occupant plans to occupy the zone for a substantial period of time. The climate conditions in the zone may be determined, and if the conditions in the zone are not at the desired comfort level for the occupant, then the CCS may attempt to bring the environment in the zone toward the desired climate condition for the occupant. A climate condition may include a temperature, humidity level and lighting condition (such as color or intensity) and a desired climate condition may also be referred to as a target climate condition or comfort level.

The occupancy detection methods described herein may also help to determine that the occupant is leaving a zone for a substantial period of time to enable adjustment of the climate, in the zone being exited, to avoid unnecessarily conditioning the zone environment and thus conserve energy.

Occupancy may be detected based on several types of sensors including thermal, ultra-sonic, video cameras, infrared sensors and sound sensors, which detect occupancy in a zone by sensing certain events or conditions, such as motion, body heat or sound. However, these sensors may be prone to false alarms. For example, in terms of detecting movement but not being able to distinguish between a transient condition such as an occupant going to a zone or room for a short period of time to, for example, fetch something and a longer period of time such as an occupant moving to a bedroom zone to retire for the night. When more than one occupant is present in a dwelling, it can also be difficult to determine which specific occupant is moving from one zone to another thus making it even more difficult to determine with a high degree of certainty the occupancy of a zone and the desired comfort level. This can result in unnecessarily conditioning a zone which has become unoccupied and an uncomfortable environment until the system detects occupancy and turns on the CCS in the zone. The cost of the occupancy detection equipment may also be costly and prohibitive in many practical applications.

In recent times, the use of radio communications has become liberal, providing a low cost, free and rich source of information for location sensing. The distance between two objects may be estimated through the use of a radio signal between the two objects. For example, the first object may transmit a radio signal to the second object. Given the transmit signal power and the measured power of the received signal, the amount of signal loss may be estimated. This in turn provides a means to estimate the direct line of sight path length or distance between the two objects. Triangulation may be performed to determine the exact three-dimensional coordinates of an unknown object if the distances between the unknown object and four or more known and fixed in space reference objects are used. It should be noted that the vector of distances uniquely captures the location of the unknown object. i.e. there cannot be any other three-dimensional spatial position which exhibits the same distance vector if the reference objects are not coplanar and no more than two reference objects lie on the same line. A distance vector may be referred to as the vector of distances from the unknown object to the known reference objects. Hence the spatial position of an unknown object may be uniquely determined by its distance vector to the known reference objects. This fact can be used to simplify the process of determining the position of an occupant for occupancy detection. An advantage of this approach may be that the actual and absolute position of the reference objects is not required and there is no need to explicitly measure the three-dimensional Cartesian or Polar coordinates of the reference objects or indeed to compute the three-dimensional coordinates at all. The necessary computations may be carried out with distance vectors.

The occupancy detection algorithm described herein may also be used to determine the position of an occupant within a region. For example with reference to FIG. 1, it may be desired to determine if an occupant 412 is occupying the circular region, 404. Four objects with radio transceivers 405, 406, 407, and 408, respectively, are shown, each communicating with the occupant who also possesses a radio transceiver. The signal from Ant 1, 408 to the occupant, 412 (the term occupant includes the occupant and the occupant's co-located and possession of a personal wireless communications device such as a smartphone and/or a wearable wrist watch) may vary in strength within the region and hence the estimated distance vector too. For example, the distance may vary from minima, 401 to maxima, 400 and go through 402 and 403 as the occupant, 412 walks around the circle, 404. Similarly, the distance, 409, 410, and 411 between the occupant and Ant 2 406, Ant 3 407 and Ant 4 408, respectively exhibit a similar behavior. By performing an analysis of the vectors gathered by the occupant's radio transceiver, it is possible to define a region distance vector space, which may be used to determine if an occupant is within the region or outside of the region. This calibration procedure may be used to log the space, region or location information, which may be later used to establish if an occupant is occupying the region or space or location.

In an alternative embodiment, the occupant's device, 412 may transmit a radio signal or beacon which is then detected by the radio transceivers, 405, 406, 407 and 408, which then communicate with a central controller to determine a distance vector, which may be subsequently used to determine occupancy.

Similarly, consider FIG. 2, which shows a depiction of a region defined by a narrow corridor bounded by 606 and 607 such as for example, an aisle in a supermarket or hallway. Strategic placement of radio transceivers 600, 601, 602, 603, and 604, along the aisle provide for a means to enable location of an occupant, 605 as (s)he moves along the corridor in direction 611. The estimate of the distance from the occupant to Ant 2, 601, Ant 3, 602 and Ant 5, 604 increases as the occupant moves down the corridor. The aisle may be partitioned into regions and the system may be calibrated for occupancy beyond for example the region defined by boundary, 612. The distance vector (608, 609, 610) for the position at the center of the boundary, 612 may be captured for calibration as:

Calibration vector=($D1cal,D2cal,D3cal$), where boundary, 612 is the outer boundary of the region represented by the spheres, which are centered on each antenna, 601, 602, and 604 with radius equal to the distance between the respective antenna and the center of the region, 612.

Subsequently, as an occupant moves around, it can be estimated that the occupant is at and beyond the boundary, 612 if:

$D1est>D1cal$ and $D2est>D2cal$ and $D3est>D3cal$, where the measure of the estimated distance to the occupant, 605 from the antenna Ant 2, 601, Ant 3, 602 and Ant 5, 604 is estimated as:

Measured vector=($D1est,D2est,D3est$).

Calibration of the system for this region boundary can be as simple as logging the signal strengths of Ant 2, 601, Ant 3, 602 and Ant 5, 604 and computing the distance vector estimate. The calibration may take into consideration that the transmit power for the transmitters may be set to different levels, for example to conserve power and/or avoid radio interference. In an alternative embodiment, the signal power may be directly logged as a representation of the distance since the signal power is inversely related to the distance. Since signal power decreases as distance increases, the measured signal powers should be less than the calibration powers to determine if the occupant is beyond the boundary.

While the traditional, centralized climate control systems provide for a means to establish a required comfort level within a dwelling, there are several shortfalls of such systems. Since the temperature is measured at the specific area where the thermostat is mounted, the system aims to establish the climate based on the temperature reading from the thermostat. This results in the area around the thermostat being controlled to the desired comfort level leaving many areas of the dwelling too warm or too cold relative to the desired climate temperature.

Several methods have been devised to overcome this problem by providing for a remote temperature sensor, which measures the temperature in another area of the dwelling, which may be an occupied area, and which relays the reading to the thermostat. The thermostat then controls the entire HVAC system based on the reading of the remote temperature sensor and not based on the local temperature sensor at the thermostat control unit. This results in moving the control point to the area in the vicinity of the remote temperature sensor, still leaving other areas of the dwelling with uncomfortable temperatures.

Another method of controlling the environment is to manually adjust the register vents to an open or closed position to bring the climate in a zone to the desired comfort level. Closing a register vent when the comfort level in a zone has been reached and opening it when the zone is too warm or too cold. This can be very effective in controlling the environment but is prone to requiring a lot of manual intervention and thus becomes cumbersome from a practical standpoint. Some automation may be introduced by incorporating a motorized system to the register vent with a radio or infra-red transceiver to enable remote control of the register vent, which can provide an easier means to control the vent but still may not be very practical.

Another way to overcome the need for manual intervention is to introduce the same form of control as a central thermostat where a timer and temperature sensor is incorporated into a motorized register vent (MRV). The MRV is designed to replace a standard manual register vent and may be easily installed by the occupant of a dwelling without need for an installation engineer. This enables the same level of temperature and timer based control as a centralized thermostat at a zone level. Alternatively, the timer and/or temperature sensor may be remotely sited in a suitable location within the same zone to measure the zone temperature. The temperature sensor can provide a measure of the localized zone temperature and thus help create a zone based CCS. This achieves a more balanced temperature control within an entire dwelling through individualized zone controls. Some level of overall control is still required to ensure overall control of the HVAC system for example when all register vents are closed, the HVAC system will also need to be turned off and when all register vents are closed and one is opened, the HVAC system will need to be turned on. Furthermore, for HVAC systems with more granular control of the operation in terms of catering for variable demand, a tighter integration with the HVAC control system is desirable.

This approach results in a more balanced and efficient CCS since circulation of air to some zones, which may heat or cool quickly can be turned off as soon as the desired climate condition has been reached, re-directing the flow of air to those zones which can benefit from the conditioned air. While achieving a more even climate control across multiple zones, inefficiencies are still present since unoccupied zones may still be subject to climate control and thus energy expended into an area which does not require cooling or heating. For example, if a zone is unoccupied relative to the timer settings, since it's a guest room or the room becomes vacated earlier than anticipated, then the climate may be unnecessarily conditioned. On the other hand, a zone which becomes occupied outside of a timer setting may require an override to turn on the climate control in the zone and may be uncomfortable until the desired climate condition has been achieved. There still remains a cumbersome process of setting up the multiple timers if there are many zones in a dwelling, which can be both daunting and frustrating for occupants to setup.

In accordance with the methods and systems described herein, a fixed timer based scheduling scheme may be learnt through an adaptive learning process based on an occupant's specific behavior patterns. The timer settings may be tuned based on measured and analyzed occupancy data, avoiding unnecessary energy consumption by conditioning an unoccupied zone or zones.

An occupancy based CCS, as described herein, offers much promise in terms of being able to optimally condition a zone based on occupancy and in overcoming the aforementioned shortfalls of manual and thermostat (timer and temperature sensor) based control systems.

Methods are described herein for a reliable occupancy detection system, which in one embodiment, may be combined with remotely controlled MRVs to provide a means of controlling the climatic conditions around an occupant in a zone. In one embodiment, installation of the CCS may be performed at low cost through a simple installation process, where the CCS may be easily installed by an occupant of a dwelling without requiring to hire an installation engineer and the associated labor costs, and where the component costs are very low.

The methods and systems described herein provide a means of establishing a comfortable environment, in terms of temperature, humidity, lighting conditions etc. in an area occupied by an occupant. The area referred to as a zone, may be a room in a dwelling or designated area under common control. The methods and systems are particularly useful when used in conjunction with components, which already incorporate a radio transceiver such as radio controlled motorized register vents and temperature sensors.

The terms receiver, transmitter and beacon are used in their general sense.

Referring to FIG. 3, various components of a MRV are shown including a control unit comprising a microprocessor and memory for program execution and data storage, a power source, a motor to provide a means for shutting off or allowing the flow of air through the vent, a radio transceiver and optionally, a temperature sensor to measure the zone air temperature, a humidity sensor to measure the zone air humidity level, a temperature sensor and a pressure/flow sensor to measure the temperature and flow of the conditioned air emerging from the register vent respectively, a vent sensor to measure if the vent is open, partially open or closed, an energy harvesting device such as a solar cell or a dynamo driven by the flow of air through the register vent, and a user interface which may comprise a display, indicator lights, audio source, microphone etc.

There are a variety of air flow control mechanisms which may be used for the register vent such as vanes which may be rotated to a shut off or open position or a screen which may be rolled down or up to a shut off or open position respectively.

The radio transceiver may have a beacon facility allowing the register vent to broadcast such information as its identity, status information such as an indication that the register vent is open or closed, battery power level, temperature, humidity, and/or transmit power level. The power level of the signal emanating from the register vent and the beacon frequency or rate of transmission may be programmable. The radio transceiver may also have a listening facility to listen for commands to for example, open or close the flow of air through the MRV.

In an alternative embodiment, the MRV may also have its own temperature sensor to measure the temperature around the MRV and regulate the flow of air through the MRV and thus operate autonomously. The radio transceiver may be omitted in this scenario.

Alternatively, a remote temperature sensor (RTS) mounted in the same zone as an MRV may enable more accurate measurement of the temperature in a zone. The RTS may comprise a radio transceiver, a power source and a temperature sensor and optionally, a humidity sensor to measure the zone air humidity level, an energy harvesting device such as a solar cell, and a user interface which may comprise a display, indicator lights, audio source, microphone etc. The radio transceiver may include a microprocessor system that provides a control function for the radio transceiver and also functions to measure the temperature and communicate with the MRV. The RTS may also have a timer capability to command the MRV to completely turn off or on the flow of air thereby conserving energy when the zone being controlled by the one or more MRVs is unoccupied. The radio transceiver of the RTS may also have a beacon facility allowing the RTS to broadcast such information as its identity, status information such as the zone temperature, an open or closed condition of the MRV register vent(s) under control, battery power level, and transmit power level. The power level of the signal emanating from the RTS and the beacon frequency may be programmable. The radio transceiver may also have a listening facility to listen for commands such as an override command to command an MRV to turn on or off the supply of air through the MRV.

Referring to FIG. 4, various components of a remote temperature sensor are shown including a control unit comprising a microprocessor and memory for program execution and data storage, a power source, a temperature sensor to measure the zone air temperature, a radio transceiver and optionally, a humidity sensor to measure the zone air humidity level, an energy harvesting device such as a solar cell, and a user interface which may comprise a display, indicator lights, audio source, microphone etc.

FIG. 5 depicts a dwelling such as a house comprising two floors. The house is partitioned into zones, which align naturally with the room boundaries and hallways. The zones have MRVs 320, 321, 322, 323 which supply a flow of conditioned air from the central HVAC unit. Additionally, RTSs 301, 302, 303, 304 are also mounted in locations in the zones where the zone temperature may be measured. The MRVs and RTSs may have built in radio transceivers which enable communications with other MRVs, RTSs, the occupant's smartphone and wearable devices, the central control unit, 380 and other home automation devices. The wireless communications may be through such communications means as Bluetooth, Bluetooth Low Energy (BLE), WiFi, Z-wave, ZigBee, cellular or power line communications. The communications may be direct or adhoc mesh networking through assistance from other devices within listening/ assisting range of the source and destination device. Other devices in the zone such as smoke detectors, sprinkler valves, cameras, thermal imagers, thermal sensors, microphones, ultra-sound sensors, and other home automation devices may also provide and facilitate occupancy detection, communications assistance and information to aid climate control.

In order to optimize power consumption of the components in the CCS, the beacons may be controlled through varying the beacon transmission rate or turning them off during periods when not required such as periods when the occupant is within a zone and not moving around or when a zone is unoccupied etc. The MRVs and RTSs may also be put on standby mode, waiting for a probe or trigger from a smartphone, wearable device or another MRV, RTS or other control device.

Return vents, 340, 341, 342, strategically located in various zones provide a means for the conditioned air to be re-circulated back to the HVAC system. Turning on or off the flow of air from MRVs, 320, and 321 based on the air temperature measured by the RTS, 301 can provide a means of controlling the comfort level within zone 1. In the process of communicating between devices, the MRVs, 320, 321, 323, 324 or RTSs, 301, 302, 303, 304 may send transmissions or beacon signals at a controlled power level and which may carry such information as their identification and status information such as temperature readings, if the MRV is blocking the flow of air or not, transmitter power level etc. An occupant of the dwelling may possess a smartphone and/or wearable device which has a radio transceiver capable of picking up these transmissions and thus capture the information being communicated. The power level of the beacon signals, rate of transmission, and length of the transmissions may be adjusted to enable efficient communications to enable other devices to listen to the transmissions but at the same time minimizing the transmitted power in order to conserve the energy used from the power source.

In one embodiment, a zone may comprise one or more MRVs and RTSs. The RTSs regulate the climatic conditions in the zone by measuring the temperature in the zone and either turning on or off the supply of air through the MRVs. When a desired temperature is reached the RTS turns off the MRV(s), to block the flow of air into the zone and when outside of a temperature control range (a dead zone or hysteresis may be used to prevent continual toggling between an on or off condition) the control RTS opens the MRV(s), to allow the flow of air into the zone.

The RTS may also be programmed with a timer function which allows the zone to be controlled by a 7-day or weekly timer which regulates the climatic conditions in the zone on a daily basis. The timer may be programmable for each day of the week individually or may have weekday and weekend settings.

The CCS may be setup to regulate and maintain the climate condition in a zone at various levels of target climate condition settings. For example, an occupied setting may be the preferred or desired climate condition, which the occupant feels is comfortable when occupying a zone, a standby setting may be an energy conservation setting (for transient zones) from which the CCS may bring a zone to a desired climate condition very quickly once activated (for example hallways, laundry rooms or bathrooms), an unoccupied setting may be a climate condition which further minimizes energy consumption for an unoccupied zone (for example bedrooms during the day on a weekend) and a maintenance setting may save even more energy than an unoccupied setting, where the CCS maintains the climate condition at a level which avoids problems associated with completely switching off the CCS in extreme climatic conditions (for example a guest room or a vacation setting for a dwelling). The intention is to avoid for example, pipes freezing during winter and excessive humid temperatures during summer, which may damage furniture. The climate condition settings may be different depending on whether the CCS is heating during winter or cooling during summer.

The RTSs and MRVs may operate cooperatively or in an autonomous manner to achieve the desired climatic conditions in a zone or zones. The control of the HVAC system may continue to be under the control of the master thermostat or controller in the dwelling. The timer settings for the master thermostat may be set based on analysis of data collected over all zones under control in a dwelling over a period of time. In such an autonomously operated system, there should preferably be at least one or two register vents which are not under any form of electronic control and always in an open position to avoid conditions when the HVAC system is on and all register vents have been closed. For example, the register vents in hallways where the thermostat is located may be manually controlled register vents left in an always open condition. Alternatively, in another embodiment, failure mode operation may ensure that at least one vent is open if the HVAC system is running.

By installing the MRV and RTS in small zone areas, such as bathrooms, the supply of air into those areas may be turned off once the desired climate comfort level has been reached, providing benefit to other areas by diverting the flow of air to those areas in need of conditioning.

The radio transceiver may be based on Bluetooth, BLE, Z-Wave, ZigBee, WiFi, Cellular or other suitable radio technology. Many user devices such as smartphones and personal wearable devices such as wrist watches are becoming available with BLE capabilities. One feature of BLE enabled devices is the ability to measure the strength of a received radio signal from a BLE transmitter and estimate the relative distance between the BLE transmitter and receiving device.

In one embodiment, the occupant may possess a BLE enabled device, such as a smartphone and/or a wearable wrist watch, which senses the beacon transmissions from the MRVs and RTSs mounted in the zones of the dwelling. By suitable processing of the beacon signals and associated information, accurate positioning of the occupant, in the zone, may be determined. By collecting data from the BLE beacon transmissions from the MRVs and RTSs with the receiver in the user device and knowing the location of the various BLE transmitters, the location of the device may be estimated through a process of triangulation. The beacon information may provide such information as the beacon identity, physical location coordinates, distance to a specific position such as a zone boundary, expected received power level to a specific position such as the aforementioned zone boundary, transmit power and other information of the specific transmitter and thus the specific MRV or RTS. The received beacon signal power may be used to provide an estimate of the distance from the smartphone or wearable device to the transmitter beacon from the appropriate MRV or RTS. The exact location of the MRV or RTS may be broadcast or logged into a database accessible by the CCS, smartphone and/or wearable device. The measured power from the MRVs and RTSs, within listening range of the smartphone or wearable device, provide the information required to accurately estimate the position of the occupant. The location of the occupant may be determined through a process of triangulation knowing the location of the MRVs and RTSs. This capability when incorporated as part of the CCS can enable estimation of the location of an occupant within a zone of a dwelling and thus the specific zone the occupant is occupying, about to enter or about to exit.

In order to illustrate how the power received by the occupant's smartphone or wearable device varies, an example path 360 is shown for points, 1, 2, 3, 4, 5, and 6 along the path.

The need to have specific spatial location coordinates of the MRVs and RTSs, which incorporate beacon radio transmitters, and triangulation of the range information to determine exact location coordinates of a receiver may be avoided. To simplify or even avoid the calibration and setup processing to explicitly measure and establish location information for the MRVs and RTSs, measured distance vectors may be used directly rather than Cartesian or Polar coordinates. Since the range information may be used to compute the exact position of the receiver, the unique set of range values from the MRVs and RTSs can be used to precisely establish the location of an occupant through a learning process. For example, the occupant may move to certain locations such as the entrance to a zone and log the location to enable the CCS to measure and store the associated received power level of the sensed beacon transmitters and compute the range values to help automatically calibrate the system. The need to compute the exact coordinates of an occupant's position is not required and thus avoided.

In another embodiment, the relative location of the occupant may be determined through a learning process by measuring and logging signal information of the various MRVs and RTSs (or other transmitter devices for example, those that may be used for a home automation system) sensed by a smartphone or wearable device over a period of time. The set of distance vectors from different MRVs or RTSs may be sufficient to uniquely establish the location of the occupant.

Since the occupant would have to enter or exit a zone through a doorway for example, if the distance vectors measured by the smartphone and/or wearable device are logged at specific points such as a doorway between two adjacent zones then subsequently, as the occupant moves around, the measured distance vectors may be compared against the logged calibration distance vectors, for a given calibration position, to determine the location of the occupant.

Through the learning process, the strength of the measurement values as the occupant leaves and enters a zone through a doorway can provide sufficient information on whether the occupant is leaving or entering a zone. The decaying signal strength from the MRVs and RTSs located in the zone the occupant is leaving and the increasing signal strength from the MRVs and RTSs located in the zone the occupant is entering can provide sufficient information to help determine and distinguish if an occupant is merely moving around within a zone or leaving one zone and entering another zone. The learning process may be used to estimate times when the occupant is at a zone boundary and to automatically calibrate the system and determine the calibration distance vectors for doorways between two zones.

Building on the earlier occupancy detection algorithm description, consider a sphere centered at a beacon transmitter of an MRV, RTS or other radio transceiver, within a zone, with radius equal to the distance from the beacon transmitter to the doorway of the zone. Consider similarly, the set of spheres centered on each of the MRV, RTS or other radio transceiver within a zone. If a single sphere or multiple spheres collectively cover the likely volume or three-dimensional space that may be visited by an occupant, within the zone, then it can be confidently estimated that the occupant is outside of the zone if for all MRV, RTS and other radio transceivers within a zone:

$$Dest > Dcal$$

where Dest represents the estimated distance from the occupant and his/her smartphone or wearable device to an MRV, RTS or other radio transceiver and Dcal represents the logged or calibrated distance for the respective MRV, RTS or other radio transceiver at the doorway or zone boundary. Conversely, if the condition does not hold for at least one estimated measurement then in all likelihood, the occupant is occupying the zone.

In an alternative embodiment, the measured power (or energy) from each beacon transmitter may be directly used to determine a calibration power vector rather than computing the distance from the power estimates. The distance is related to the beacon signal power loss, from the beacon transmitter to the receiving radio, which may be determined from the measured power and knowledge of the transmit power level. The measured power from beacon transmitters falls as an occupant moves out of a zone and hence recording the received power at a zone boundary provides for sufficient calibration information to estimate occupancy. It can be confidently estimated that the occupant is outside of the zone if for all MRV, RTS and other radio transceivers within the zone:

$Pest < Pcal$ where Pest represents the estimated power from an MRV, RTS or other radio transceiver at the occupant's smartphone or wearable device and Pcal represents the logged or calibrated power, from the respective MRV, RTS or other radio transceiver, as measured at the doorway or zone boundary. Conversely, if the condition does not hold for at least one estimated power measurement then in all likelihood, the occupant is occupying the zone.

When calibration data and radio transmitter measurements are analyzed and compared from adjacent zones, accurate prediction of an occupant's position may be established. Ambiguity about an occupant's position in a zone may be reduced or eliminated by combining decision making from two adjacent zones since if an occupant is in one zone then the occupant may not be in the adjacent zone at the same time. Walls and glass provide a natural way of containing an RF signal. Due to radio signal propagation characteristics through air and the inherent accelerated power loss through walls and glass, signal power loss measurements aid in overly estimating distance, when considering the received signal power from beacons placed outside of the zone in which measurements are being made. This helps in distinguishing further the location of an occupant within a zone vs. outside a zone.

When considering the constraints of a zone boundary (e.g., room walls), movement of an occupant within a zone, and the strategic positioning of beacon transmitters, a minimum of a single sphere and hence a single beacon transmitter power calibration value may suffice to determine if an occupant is occupying a zone or not. In another embodiment, the radio technologies may be mixed or interchanged as long as the capabilities exist to enable measurement of distance between any two radio transceivers and communications between devices. So for example a BLE radio, a ZigBee radio and a Z-Wave radio on different devices, communicating with a smartphone and/or wearable device with all three radio transceivers, may be utilized to ascertain individual distances, communicate between themselves and collectively determine occupancy of an individual.

Referring to FIG. 6, a plot of the power or energy received from various MRVs and RTSs is shown. It can be seen that the power level from the MRVs, 320, 321, and RTS 301 in zone 1 which is being vacated by an occupant fades as the occupant leaves zone 1 and the power level from MRV, 322 and RTS 302, 303 in zone 2, which the occupant is entering increases as the occupant enters zone 2. It can also be seen that the power vector set at the boundary between zone 1 and zone 2 (the doorway), point 3 of path 360, provides a unique set of signal power values or a power vector, which is related to the actual location or position of the occupant. During a calibration process or through a learning process, a vector of signal power values may be logged to calibrate position information. This information may later be used to assess and determine if an occupant is passing through a doorway, at the boundary between two adjacent zones, and hence moving from one zone to another. Rather than compute the actual physical location of the occupant in a three-dimensional coordinate system, the relation between the signal power vector, RTS and MRV locations and the physical location may be used to infer the position of the occupant, avoiding the need to store explicit three-dimensional position information for the MRVs and RTSs and computing position coordinates. Measuring and interpreting the signal power data around the event leading up to and after passing through the doorway along path 360 for example points, 2, 3, and 4 leads to information which can enable tracking of an occupant. Occupancy of a zone may thus be established without the need for complex location measurement data for the various beacon transmitters such as the MRVs and RTSs and then triangulation to establish the actual physical position of the occupant.

Consider FIG. 7, which replicates Zone 1 from FIG. 5. Two MRV, 702 and 703 together with an RTS, 701 are shown in the figure. Consider the volume of the spheres centered on each of the RTS, 701, MRV, 702 and MRV, 703 with a radius that spans to the doorway, 720. The boundary of the spheres is represented by 710, 711, and 712 respectively and the spheres collectively cover the three-dimensional space in the zone. When the occupant is in Zone 1, the measured distance from the occupant to at least one of the RTS, 701, MRV, 702 and MRV, 703 will be less than the corresponding radius measure. This provides an indication that the occupant is in the zone. If the measured distance for each of the RTS, 701, MRV, 702 and MRV, 703 is greater than the corresponding radius measure then the occupant is outside Zone 1 and in the adjacent zone. This form of analysis provides for a robust occupancy detection scheme taking into consideration the physical boundary of a zone and the doorway, 720 which is the only way in or out of Zone 1.

A sphere radius is related to the measured beacon signal power loss from a beacon transmitter to the doorway, 720. This in turn is related to the measured beacon signal power assuming the transmit signal power is known. A measure of the received signal power from each of the RTS, 401, MRV, 702 and MRV, 703 at the doorway, 720 can represent a calibration power vector. The measured signal power from each of the beacon transmitters of the RTS, 401, MRV, 702 and MRV, 703 can be collected in a measured signal power vector. When the occupant is in Zone 1, the measured signal power to the occupant from at least one of the RTS, 701, MRV, 702 and MRV, 703 will be greater than the corresponding calibration power. Alternatively, if the measured signal power for each of the RTS, 701, MRV, 702 and MRV, 703 is less than the corresponding calibration power then the occupant is outside Zone 1 and in the adjacent zone.

In an alternate simplified scenario, the sphere of MRV, 703 represented by the boundary 712 occupies almost all of the space within the room so just measuring the signal power from 703 and comparing with the corresponding calibration power may provide sufficient information to determine if an occupant is in the zone or not.

Referring to FIG. 8, a plot of the aggregate power received from the MRVs, 320, 321 and RTS, 301 within zone 1 and MRV, 322 and RTSs, 302, 303 are shown. Notice that the power level of beacons from zone 1, which is becoming unoccupied diminishes as the occupant leaves zone 1 and the power level of beacons from zone 2, which is becoming occupied increases as the occupant enters zone 2. In an alternative embodiment, this aggregate power profile and the cross-over point of the power curves may help to identify the position of an occupant and thus the occupancy of a zone. This aggregate power profile may also be used to help learn over a period of time, the calibration power vectors for occupancy detection and thus avoid the need for an occupant to explicitly move around a dwelling to log calibration power vectors for each zone.

The timer settings to turn on or off the CCS in each zone may be established through a learning process. For example, through observation of the occupant over a period of time, the times when the occupant enters and leaves a zone may be analyzed for common patterns of behavior over a weekly cycle for each day of the week. Furthermore, times when the occupant enters or exits the dwelling may also be logged and analyzed. GPS data can also aid in determining occupant movement into and out of a dwelling. Common behavior patterns such as times when the occupant leaves a dwelling (e.g. for work) or arrives at a dwelling (e.g. from work) can aid in establishing overall behavior patterns. The data for times when the occupant is entering or exiting a zone can be averaged and used to program the timer(s) for each zone on an individual basis.

The timer settings from the learnt data may be used to optimally control the energy consumption in the zones of a dwelling based on measured occupancy data. Once the timers are programmed with the learnt timer settings the CCS may control zones in an optimal manner obviating the need to program the timers for each and every zone on an individual basis. The need for dynamic location sensing and control may not be necessary once the timers are programmed.

In an alternative embodiment, the timer settings may include further supplementary data to capture behavioral patterns, which may be matched against actual dynamically observed movement patterns so as to aid accurate prediction of occupant movement within a dwelling and to accurately carry out autonomous decisions to control the settings of the CCS.

The CCS system may determine if an occupant has entered a zone for a sustained period of time. For example, if it is determined that the occupant has entered a particular zone then further beacon measurements may be repeated. A voting may then be carried out to count the number of times a decision is made that the occupant is in the same predicted zone. If the occurrence or probability of predicting the same zone is high (for example more than 80% for the same zone) then it may be considered that the occupant has entered the zone for a sustained period of time. The CCS may then set the target climate condition in the zone to the occupied setting required by the occupant. Additionally, the CCS may confirm the prediction through interaction with the occupant. For example, the CCS may alert the occupant through a soft beep on his/her smartphone and/or wearable device or from one of the MRVs or RTSs indicating that the CCS is about to put the predicted zone into an occupied setting. The occupant may override the control by proactively interacting with the CCS through some action such as clicking a button on his/her smartphone or wearable device to prevent the CCS from switching to an occupied mode. The objective is to avoid false alarms switching the CCS settings such as for example, the occupant is in the predicted zone for only a short period of time, which may be considered a transient condition, and when it may be unnecessary to change the settings. Alternatively, if the CCS detects the occupant entering a zone but at a lower probability or confidence level then the system may still alert the occupant through a different tone (or some other indication such as two beeps to help distinguish between the different forms of alert signals) indicating that the occupant entering the zone has been detected but the confidence in establishing sustained presence is low. The CCS may not change the settings of the system since it is anticipating that the occupant may be in the zone only temporarily and that a transient condition exists. The occupant may have the option to override the decision through some simple action such as clicking a button on his/her smartphone or wearable device to proactively switch the zone to occupied mode. Other forms of simple, non-intrusive and low friction means of communication between the occupant and CCS may also be used such as voice commands, vibration etc.

Correspondingly, if an occupant has been determined to have entered a zone then it can also be concluded that the occupant has left the zone (s)he was in previously and this zone may be switched to a standby, unoccupied or maintenance setting to conserve energy. Additionally, if the strongest beacon signal power, from a beacon scan or sweep, is below a minimum power threshold then the occupant may be considered to have left the dwelling for a sustained period of time and similar actions may be carried out for all the zones of the dwelling.

FIG. 9 shows a method of calibrating the CCS to aid in sensing when an occupant is at a zone boundary. At 100 the calibration process begins. At 101, the information from all sensed beacons is recorded on a continuous basis as the occupant moves through a dwelling from one zone to another. At 102, the occupant logs onto his/her smartphone or wearable device that (s)he is positioned at a particular zone boundary. At 103, beacons are monitored and the received power and other information such as the beacon transmitter identity, transmit power level, and status information of all beacon transmitters in both adjacent zones is recorded. A proxy for the distance to each sensed beacon is determined based on the logged beacon received power information and a power vector determined for each zone's beacon transmitters. At 104, a record is made, in a database, of the calibration power vector at a zone boundary for all transmitters in a zone together with other calibration information. This information may help to establish direction of movement and zone entry/exit detection during occupancy movement detection. At 106, a check is made to determine if all zone boundaries have been logged. At 105, the occupant continues to moves to another zone boundary to log further power vector calibration data. At 107, the calibration process has been completed.

To illustrate the occupancy detection algorithm for a single occupant of a dwelling, FIG. 10 shows a method for using the calibration data to sense when an occupant is entering a zone. At 200, begin. At 201 beacons are monitored. The signal power and information from all beacons is measured on a continuous basis. At 202 a determination is made that the occupant has entered a zone. For example, a scan of beacons is carried out, the receive power measured and the identity of each radio transceiver sensed is determined from the information broadcast on it's beacon. Given the identity of a radio transceiver, the zone within which the radio transceiver is located is looked up in a database. A list of measured power vector readings are gathered for each zone. This process is carried out for all beacon transmitters sensed and mapped to their corresponding zones. The corresponding calibration power vector is also looked up in the database. It can be determined that the occupant is occupying a particular zone if the measured power is greater than the corresponding calibration power for at least one measured power value in a power vector for the zone.

At 203, a determination is made that the occupant has entered the zone for a sustained period of time. For example, it may be determined that an occupant has entered a zone for a sustained period of time if several consecutive beacon scans are carried out in a zone. A voting process may be carried out to count the number of times a decision is made that the occupant is in the same predicted zone. If the occurrence or probability of predicting the same zone is high then it may be considered that the occupant has entered the zone for a sustained period of time. At 204, the target climate condition settings in the zone are set to the occupant's occupied setting. Correspondingly, the target climate condition settings in the zone that the occupant may have exited (if the occupant is moving within zones of the dwelling as opposed to entering the dwelling) may be set to an unoccupied setting.

More than one occupant may be present in a dwelling. When a zone is occupied by more than one occupant, the settings may be adjusted to meet the preference/needs of all occupants. For example, the average temperature preferred by all occupants may drive the operating point of an occupied temperature setting. Alternatively, the operating point may be set to the preferred lowest temperature when cooling or highest temperature when heating. Various means of arriving at a consensus temperature setting are possible.

When a zone becomes completely unoccupied, the conditioned air in that zone may be used to warm or cool another zone which becomes occupied. Re-cycled conditioned air from an unoccupied zone may be directed to the HVAC unit, via the return vents in the unoccupied zone, to help conserve energy. For example, if the air temperature in an unoccupied zone is closer to the desired comfort setting than the air in the zone being conditioned, then it may be re-directed to the HVAC for re-conditioning and re-circulation thus transferring energy from an unoccupied zone to another zone. For example, the temperature in the basement of a dwelling can at times be cooler than other parts of a dwelling during summer and warmer during winter. So air from the basement of a dwelling may also be re-circulated to bring the comfort level in a zone to a desired comfort level. Return vents may also have an integrated fan which may be turned on to assist with the re-circulation of air.

Furthermore, the air outside of a dwelling may also be suitable for conditioning. Dampers, vent controls or automatic window controls may be used to control the flow of air in and out of a dwelling and for these to be turned on or off (or windows and/or shades opened or closed) as required. Temperature and humidity sensors outside of a dwelling may help establish if the outside air quality is worthy of circulating within the dwelling. Often, the air outside of a dwelling may be cooler than inside a dwelling during summer nights when the outside temperature drops and the dwelling may have been warmed by greenhouse effects.

In place of or in addition to MRVs, zone control dampers which fit into and anywhere along existing duct work may be used to control the flow of air to and from the HVAC system and the different zones.

In addition to measurement of temperature, the relative humidity level of the air can have an impact on the comfort perceived by an occupant. For example, to achieve the same level of comfort, lowering the humidity level when cooling the air in a zone can enable the temperature set point to be set at a slightly higher level than without humidity control. Likewise, increasing the humidity level when the climate is being warmed in winter can enable the temperature setting to be lower than without humidity control. Humidity control combined with temperature control can enable the desired climate conditions to be achieved with further savings in energy consumption.

The HVAC system may have a supplementary humidity control unit enabling the humidity level of the conditioned air to be increased or lowered as necessary. For example, a humidifier may be used to introduce humidity into the conditioned air and a de-humidifier may be used to reduce humidity in the conditioned air. The humidity control system may be independently controlled by its own control system or under the control of the CCS.

Additional means of helping to conserve energy and establish the preferred climate conditions in a zone include control of lights, windows and window shades. For example, opening blinds to allow the heat from the sun to warm a zone when heating a zone and closing blinds to prevent the heat from the sun from unnecessarily warming a zone when cooling a zone. Turning lights off in an unoccupied zone may help reduce unnecessary energy consumption. Dimming lights or turning them off when cooling a zone may also help reduce heat generation from lighting systems. Opening windows and shades to allow flow of air in or out of a dwelling and closing windows and shades to shut off the flow of air may also help to establish the desired comfort level in a dwelling. All of these may be controlled by the CCS.

In another embodiment, a pressure, flow and temperature sensor may be incorporated in the MRV which may then measure the pressure, flow rate and temperature of the air flowing out of the MRV or into return vents. The sensor readings may help to more efficiently regulate the HVAC system and CCS to jointly and quickly reach the desired temperature in a zone and then maintain the climate in the most efficient manner.

In yet another embodiment, sensors in the smartphone or wearable device may provide information, such as temperature, humidity and so forth, as required for the CCS system to control the climate in the zone being occupied by an occupant.

The MRVs, RTVs and wearable device(s) may be interconnected by way of a communications network to a central control unit for the HVAC, which may replace the thermostat. The communications network may be a point to point network, a mesh network, an adhoc network or any network facilitating overall control. The central CCS unit then provides an overall control system to turn on the HVAC when at least one zone demands climate control and turn off the HVAC when all zones have closed their MRVs. In this case all register vents in the dwelling may be MRVs with no need to have manual register vents to prevent conditions when the HVAC is on and all MRVs have been closed causing faults such as blocking the airflow from a running HVAC system. The HVAC may be regulated for air temperature, flow rate, low through high throttle or fan only, as needed to match demand and supply the appropriate amount of conditioned air to the zones that are being conditioned. The HVAC may be throttled at a low rate when only servicing one or two zones and to a higher rate when many zones are being serviced.

All or parts of the CCS control functions may also be provided by the occupant's smartphone and/or wearable device which may inter-operate with the CCS control unit, MRVs or RTSs. For example, the smartphone may have an application, which enables any and all of the MRV and RTS to be configured or programmed, status read, or function overridden etc., thus providing the occupant with full control of the CCS from his/her smart phone. The CCS may also be equipped with a WiFi or other communications capability to provide general Internet connectivity. The occupant's smartphone may also be able to communicate with the CCS over the Internet and thus control the CCS from anywhere within the dwelling or from anywhere outside the dwelling where broadband network connectivity and an Internet service is available.

While the illustrative embodiment considers a HVAC system, there are systems where only heating is controlled.

For example, a heating system with hot water radiators controlled with thermostatic radiator valves. Turning a radiator valve on or off enables localized control at an individual radiator level and thus similar level of control to a MRV. In these systems, the radiator valves may be equipped with a wireless communications capability which may be controlled by the temperature sensor, RTS.

Similarly, the system may be extended to control lighting, windows and window shades, door locks, security systems and other home appliances and services in order to provide predictive convenience to occupants of a dwelling.

When some MRVs are closed within a dwelling, the demand on the HVAC system may be reduced in order to conserve energy. HVAC systems are typically tuned by taking into consideration amongst other parameters, the volume of air which needs to be conditioned, the size of the ducting, the air pressure, and the size and number of register vent outlets. Hence when turning off some of the MRVs, in order to estimate the change in demand on the HVAC system, being able to estimate the volume of air that needs to be conditioned is an important parameter. The air volume requiring conditioning may be estimated from volume estimates for the zones where the MRV are open and air is being conditioned. The volume of a zone may be estimated from the estimated distance information, between the zone boundary or doorway between zones and beacon transmitters, collected earlier when calibrating the CCS. The largest distance value may be a close approximation of the diagonal dimension of the zone; the other distance measures may be close approximations of the side dimensions. These measures may be used to approximate the area and hence the volume of a zone.

One simple way of estimating the zone area is as follows. Consider a zone as a rectangular bounded region and A as the diagonal and B and C as the side dimensions. Then if distance measurements for three beacon transmitters in a zone are available (for example from the earlier mentioned calibration data) then the larger dimension could be assigned to A, the other two dimensions to B and C assuming B and C are at least half of A (for example dismissing a beacon transmitter close to a doorway). Since:

$$(B+C)^2 = B^2 + C^2 + 2*B*C$$

It follows that:

Estimate of base area of zone = $B*C = ((B+C)^2 - A^2)/2$

Since $A^2 = B^2 + C^2$

From the zone, base area, given an estimate of the floor to ceiling height in the dwelling, the zone volume may be estimated.

In another embodiment, the square of the geometric mean of the distance measures may be used to estimate the zone area. Without restriction, other means of estimating the zone volume from the estimated calibration distances are also possible.

The estimated volume to be conditioned may then be used to estimate demand and control the HVAC system at an optimal level.

The methods and systems described herein may be implemented in a CCS employing radio communications equipment using Wireless LAN (WLAN, 802.xx), cellular communications (GSM, GPRS, Edge, WCDMA, cdma or LTE), Bluetooth (BT) or Bluetooth Low Energy (BLE), Z-Wave, ZigBee, power line, optical light or other communications technologies. Peer-to-peer communications, direct point-to-point communications or a mesh network may be employed to facilitate communications between various devices on the network and the controller. However, this is not limiting and the invention may be implemented with controllers employing other types of communication capabilities. The present invention can be implemented using any wireless communications network system, such as a time division duplex (TDD) or frequency division duplex (FDD), or Orthogonal Frequency Division Multiplexing (OFDM) wireless system.

While reference is made to an occupant's smartphone or wearable device, the occupant may possess other communications devices which facilitate a similar function.

As an illustrative example of how a wireless radio system using BLE radio transceivers may be utilized for the CCS described herewith, a suggested implementation is described hereinafter. BLE has a way of operating in a very low power mode of operation where advertising beacon signals may be periodically broadcast, consuming very little power. For example, it is possible to transmit beacon signals at a rate of once per second with a coin cell battery which may last more than a year. This mode of operation may be used to perform radio signal strength measurements for distance measurements as described earlier. However, it is desirable to communicate between radio transceivers, and thus operating purely in a transmit only mode would not be practical. Turning on the radio receiver every beacon broadcast would drain battery power. Reducing the transmission rate of the beacons and turning on the receiver every beacon would make the system sluggish, slow to respond, and impact overall performance.

BLE radios may also use low accuracy clock sources which make maintaining tight radio synchronization difficult to maintain on a sustained basis. Typical BLE radios sniff at the beacon advertising frequencies rather than continuously listen in order to conserve power, leading to long discovery and synchronization times. The beacon transmission rate has a direct relationship to the synchronization time. A high beacon transmission rate leads to quicker discovery and synchronization times. However, it's not always feasible to operate at a high beacon transmission rate. A more desirable approach is to balance power consumption and responsivity by turning on the receiver periodically, for two-way communications, but at a lower rate than the advertising beacon transmissions, which may be used for synchronization and other broadcast information.

FIG. 11 shows a diagram of a system where the three main advertising channels of BLE are configured to transmit beacon signals at a regular transmission rate. In this embodiment, the beacon signals 503, 504 and 505 are configured to only transmit a beacon and not perform any listening in order to conserve power. In the illustration, every 9th beacon, 500 is configured as a beacon capable of transmitting and also receiving and listening to incoming transmissions from other radios such as those which may detect the beacon signals. This form of beacon is referred to herein as a listening beacon. So in order to assist a receiving radio, which may be listening to beacon transmissions, to identify the timing for the listening beacon, each beacon, for example beacon 501, 502, is encoded with a decrementing sequence number as illustrated in the FIG. 11. The sequence number decrements with every beacon transmission and is equal to zero for the listening beacon. A receiver wishing to communicate with a beacon transmitter may rapidly discover and synchronize with the beacon transmissions and extract the sequence number. The sequence number then enables the receiver to sleep up to the point of the next listening beacon time, conserving power. The faster transmission rate of the beacon transmissions also enables the receiver to rapidly estimate movement, for example if the occupant is moving from one zone to another, and rapidly respond to the need to change the mode of operation of the CCS in a zone.

In one embodiment, the listening beacon may be staggered between the advertising channels, providing an opportunity for a receiving radio to connect with the beacon transmitter faster than would be possible if the listening beacon timing phase was the same across all advertising channels. In another embodiment, when it is predicted that an occupant is moving from one zone to another, sensing may be required with speed and accuracy. This may be achieved by locally increasing the beacon transmission rate for a short duration to enable accurate prediction of occupancy and the subsequent control signaling. Alternatively, if it is known that a zone is unoccupied or it is estimated that an occupant is going to be in a zone for a substantial period of time then the advertising beacon transmission rate of the BLE radios may be reduced to conserve power consumption. In another embodiment, the data broadcast on a beacon may be minimal, to keep the transmission burst length short, such as broadcasting only an identity and sequence number and the broadcast information may be expanded during the listening beacon transmission to conserve overall power consumption. Adapting the beacon information elements, transmission rate and the relative occurrence of the listening beacons allows adaptation of the system operation over a wide operating range whilst remaining responsive and conserving power.

FIG. 12 is a block diagram of an exemplary computing system that may be used to implement the occupancy detection methods described above. The computing system may also be used to implement the controller of a CCS, which may perform the climate control functions described above. Computing system 900 is controlled primarily by computer readable instructions, which may be in the form of software, wherever, or by whatever means such software is stored or accessed. Such computer readable instructions may be executed by a central processing unit (CPU) 910 to cause computing system 900 to do work, such as performing the occupancy detection and/or climate control methods described above. The central processing unit 910 may comprise a single processor, such as a microprocessor. In other embodiments, the central processing unit 910 may comprise multiple processors. Coprocessor 915 is an optional processor, distinct from main CPU 910, that may perform additional functions or assist CPU 910.

In operation, CPU 910 fetches, decodes, and executes instructions, and transfers information to and from other resources via the computer's main data-transfer path, system bus 905. Such a system bus connects the components in computing system 900 and defines the medium for data exchange. System bus 905 typically includes data lines for sending data, address lines for sending addresses, and control lines for sending interrupts and for operating the system bus. An example of such a system bus 905 is the PCI (Peripheral Component Interconnect) bus.

Memory devices coupled to system bus 905 include random access memory (RAM) 925 and read only memory (ROM) 930. Such memories include circuitry that allows information to be stored and retrieved. ROMs 930 generally contain stored data that cannot easily be modified. Data stored in RAM 925 can be read or changed by CPU 910 or other hardware devices. Access to RAM 925 and/or ROM 930 may be controlled by memory controller 920. Memory controller 920 may provide an address translation function that translates virtual addresses into physical addresses as instructions are executed. Memory controller 920 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 900 may contain peripherals controller 935 responsible for communicating instructions from CPU 910 to peripherals, such as, keyboard 945, mouse 950, and secondary memory storage 955, which may comprise a disk drive or the like.

Display 965, which is controlled by display controller 963, is used to display visual output generated by computing system 900. Such visual output may include text, graphics, animated graphics, and video. Display 965 may be implemented with a CRT-based video display, an LCD-based flat-panel display, gas plasma-based flat-panel display, or a touch-panel. Display controller 963 includes electronic components required to generate a video signal that is sent to display 965.

Further, computing system 900 may contain transceiver 970 that may be used to connect computing system 900 to an external communications network 960. Communications network 960 may comprise any one or combination of fixed-wire local area networks (LANs), wireless LANs, fixed wire wide-area-networks (WANs), wireless WANs, fixed wire extranets, wireless extranets, fixed-wire intranets, wireless intranets, fixed wire and wireless peer-to-peer networks, fixed wire and wireless virtual private networks, the Internet, and the wireless Internet. As mentioned above, the communications network 960 and transceiver 970 may operate in accordance with any one or more of a variety of different communication protocols, such as Bluetooth, Bluetooth Low Energy (BLE), Z-Wave, ZigBee, WiFi (802.xx), cellular (GSM, GPRS, Edge, WCDMA, CDMA or LTE) or other suitable radio technology.

It is understood that any or all of the systems, methods and processes described herein may be embodied in the form of computer executable instructions (i.e., program code) stored on a computer-readable storage medium or memory which instructions, when executed by a processor (such as a processor of a computing system), perform and/or implement the systems, methods and processes described herein. Specifically, any of the steps, operations or functions described above that are performed either at a computing system, controller, sensor, or other device may be implemented in the form of such computer executable instructions executed by a processor of the computing system, controller, sensor, or other device. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other non-transitory medium which can be used to store the desired information and which can be accessed by a computer. As used herein, the term computer-readable storage medium does not encompass a signal or other transitory medium.

Changes may be made to the above-described embodiments without departing from the broad concepts thereof. The methods and systems described herein are not limited to the particular embodiments disclosed but are intended to cover all modifications which are in the spirit and scope of the disclosed concepts as defined by the appended claims.

What is claimed is:

1. A computer implemented method for establishing an environment in a building based on the location of a wireless communications device, the method comprising:
   receiving a transmission of identity signals from a plurality of reference objects wherein:
      the plurality of reference objects are spatially distributed within the building comprising one or more zones; and
      each of the plurality of reference objects is associated with one of the one or more zones;
   determining a zone from the one or more zones that is associated with each of the received identities, by inspecting a database;
   determining a plurality of target zone reference objects associated with a target zone selected from the one or more determined zones;
   retrieving a calibration distance for each of the plurality of target zone reference objects wherein:
      the plurality of target zone reference objects are associated with a calibration position at an exit or entry point at a boundary of the target zone;
      the calibration position is the same for the plurality of target zone reference objects;
      a calibration distance for each of the plurality of target zone reference objects is a measure of the distance between the calibration position and the position of the respective target zone reference object;
      each of the plurality of target zone reference objects is further associated with a respective sphere wherein the sphere is centered at the position of the respective reference object with a radius represented by the corresponding calibration distance;
      each sphere overlaps with at least one other sphere and a coverage space is determined by the collective space occupied by the spheres; and
      the plurality of target zone reference objects are placed in the target zone such that the coverage space extends outside of the target zone boundary to cover the space in the target zone;
   determining a distance measure between the wireless communications device and each of the plurality of target zone reference objects;
   comparing for each of the plurality of target zone reference objects, the calibration distance with the corresponding determined distance measure;
   determining that the wireless communications device is in the target zone when the comparison establishes that the calibration distance is greater than the corresponding determined distance measure for at least one of the plurality of target zone reference objects; and
   controlling the environment in the target zone based on determining that the wireless communications device is in the target zone.

2. The method as recited in claim 1, wherein controlling the environment comprises at least one of setting a climate temperature, a climate humidity level, or a climate lighting condition within the target zone.

3. The method as recited in claim 1, wherein:
   the calibration distance for each of the plurality of target zone reference objects comprises a measure of a calibration signal power loss for a transmit signal from the reference object, as received by a wireless receiver placed at the calibration position; and
   the distance measure for each of the plurality of target zone reference objects comprises a measure of a signal power loss of a transmit signal from the respective reference object, as received by the wireless communications device.

4. The method as recited in claim 1, further comprising:
   determining that the wireless communications device is not occupying the target zone when the comparison establishes that the calibration distance is less than the corresponding determined distance measure for each of the plurality of target zone reference objects;
   retrieving previously determined occupancy information of the wireless communications device;
   determining that the wireless communications device has exited the target zone based on the retrieved previously determined occupancy information establishing that the wireless communications device was previously in the target zone and a determination that the wireless communications device is not in the target zone; and
   controlling the environment in the target zone, based on determining that the wireless communications device has exited the target zone.

5. The method as recited in claim 1, wherein an occupant possesses the wireless communications device, and wherein the method further comprises determining if the occupant is in the target zone based on the location of the occupant's wireless communications device.

6. The method as recited in claim 1, wherein:
   the calibration distance for each of the plurality of target zone reference objects comprises a calibration signal power loss of a transmit signal from a wireless transmitter placed at the calibration position, as received by the respective reference object; and
   the distance measure for each of the plurality of target zone reference objects comprises a measure of a signal power loss of a transmit signal from the wireless communications device, as received by the respective reference object.

7. The method as recited in claim 1, further comprising:
   determining that the wireless communications device has entered the target zone for a sustained period of time; and
   controlling the environment based on determining that the wireless communications device has entered the target zone for a sustained period of time.

8. A computing system comprising a processor and a memory, the memory storing data and computer-executable instructions that, when executed by the processor, cause the computing system to:
   receive transmissions of identity signals from a plurality of reference objects wherein:
      the plurality of reference objects are spatially distributed within a building comprising one or more zones; and
      each of the plurality of reference objects is associated with one of the one or more zones;
   determine a zone from the one or more zones that is associated with each of the received identities, by inspecting a database;
   determine a plurality of target zone reference objects associated with a target zone selected from the one or more determined zones;
   retrieve a calibration distance for each of the plurality of target zone reference objects wherein:
      the plurality of target zone reference objects are associated with a calibration position at an exit or entry point at a boundary of the target zone;

the calibration position is the same for the plurality of target zone reference objects;

a calibration distance for each of the plurality of target zone reference objects is a measure of the distance between the calibration position and the position of the respective target zone reference object;

each of the plurality of target zone reference objects is further associated with a respective sphere wherein the sphere is centered at the position of the respective reference object with a radius represented by the corresponding calibration distance;

each sphere overlaps with at least one other sphere and a coverage space is determined by the collective space occupied by the spheres; and the plurality of target zone reference objects are placed in the target zone such that the coverage space extends outside of the target zone boundary to cover the space in the target zone;

exchange at least one wireless communication message between the wireless communications device and each of the plurality of target zone reference objects;

determine based on the at least one wireless communication message, a distance measure between the wireless communications device and each of the plurality of target zone reference objects;

compare for each of the plurality of target zone reference objects, the calibration distance with the corresponding determined distance measure;

determine that the wireless communications device is in the target zone when the comparison establishes that the calibration distance is greater than the corresponding determined distance measure for at least one of the plurality of target zone reference objects; and control the environment in the target zone based on determining that the wireless communications device is in the target zone.

9. The computing system as recited in claim 8, wherein the computer-executable instructions that, when executed by the processor, further cause the computing system to:

determine that the wireless communications device is not occupying the target zone when the comparison establishes that the calibration distance is less than the corresponding determined distance measure for each of the plurality of target zone reference objects;

retrieve previously determined occupancy information of the wireless communications device;

determine that the wireless communications device has exited the target zone when the retrieved previously determined occupancy information establishes that the wireless communications device was previously in the target zone and a determination that the wireless communications device is not in the target zone; and control the environment in the target zone based on a determination that the wireless communications device has exited the target zone.

10. The computing system as recited in claim 8, wherein the computer-executable instructions that, when executed by the processor, further cause the computing system to control the environment that comprises at least one of setting a climate temperature, a climate humidity level, or a climate lighting condition within the target zone.

11. The computing system as recited in claim 8, wherein the computer-executable instructions that, when executed by the processor, further cause the computing system to:

determine that the wireless communications device has entered the target zone for a sustained period of time; and control the environment based on determining that the wireless communications device has entered the target zone for a sustained period of time.

12. A computer implemented method for establishing an environment in a building based on the location of a wireless communications device, the method comprising:

receiving a transmission of identity signals from a plurality of reference objects wherein:

the plurality of reference objects are spatially distributed within the building comprising one or more zones; and each of the plurality of reference objects is associated with one of the one or more zones;

determining a zone from the one or more zones that is associated with each of the received identities, by inspecting a database;

determining a plurality of target zone reference objects associated with a target zone selected from the one or more determined zones;

retrieving a calibration signal power for each of the plurality of target zone reference objects wherein:

the plurality of target zone reference objects are associated with a calibration position at an exit or entry point at a boundary of the target zone;

the calibration position is the same for the plurality of target zone reference objects;

a calibration signal power for each of the plurality of target zone reference objects is a measure of a signal power from the respective target zone reference object as received by a wireless receiver placed at the calibration position;

each of the plurality of target zone reference objects is further associated with a respective sphere wherein the sphere is centered at the position of the respective reference object with a radius represented by a distance between the reference object and the calibration position;

each sphere overlaps with at least one other sphere and a coverage space is determined by the collective space occupied by the spheres; and the plurality of target zone reference objects are placed in the target zone such that the coverage space extends outside of the target zone boundary to cover the space in the target zone;

exchanging at least one wireless communication message between the wireless communications device and each of the plurality of target zone reference objects;

determining a measure of a signal power from each of the plurality of target zone reference objects as received by the wireless communications device;

comparing for each of the plurality of target zone reference objects, the calibration signal power with the corresponding determined measure of a signal power;

determining that the wireless communications device is in the target zone when the comparison establishes that the calibration signal power is less than the corresponding determined measure of a signal power for at least one of the plurality of target zone reference objects; and controlling the environment in the target zone based on determining that the wireless communications device is in the target zone.

13. The method as recited in claim 12, further comprising:

determining that the wireless communications device is not occupying the target zone when the comparison establishes that the calibration signal power is greater than the corresponding determined measure of a signal power for each of the plurality of target zone reference objects;
retrieving previously determined occupancy information of the wireless communications device;
determining that the wireless communications device has exited the target zone based on the retrieved previously determined occupancy information establishing that the wireless communications device was previously in the target zone and a determination that the wireless communications device is not in the target zone; and
controlling the environment in the target zone based on a determination that the wireless communications device has exited the target zone.

14. The method as recited in claim 12, further comprising:
retrieving previously determined occupancy information of the wireless communications device;
determining that the wireless communications device has entered the target zone for a sustained period of time; and
controlling the environment based on determining that the wireless communications device has entered the target zone for a sustained period of time.

15. A computing system comprising a processor and a memory, the memory storing data and computer-executable instructions that, when executed by the processor, cause the computing system to:
receive transmissions of identity signals from a plurality of reference objects wherein:
the plurality of reference objects are spatially distributed within a building comprising one or more zones; and
each of the plurality of reference objects is associated with one of the one or more zones;
determine a zone from the one or more zones that is associated with each of the received identities, by inspecting a database;
determine a plurality of target zone reference objects associated with a target zone selected from the one or more determined zones;
retrieve a calibration signal power for each of the plurality of target zone reference objects wherein:
the plurality of target zone reference objects are associated with a calibration position at an exit or entry point at a boundary of the target zone;
the calibration position is the same for the plurality of target zone reference objects;
a calibration signal power for each of the plurality of target zone reference objects is a measure of a signal power from the respective target zone reference object as received by a wireless receiver placed at the calibration position;
each of the plurality of target zone reference objects is further associated with a respective sphere wherein the sphere is centered at the position of the respective reference object with a radius represented by a distance between the reference object and the calibration position;
each sphere overlaps with at least one other sphere and a coverage space is determined by the collective space occupied by the spheres; and
the plurality of target zone reference objects are placed in the target zone such that the coverage space extends outside of the target zone boundary to cover the space in the target zone;
exchange at least one wireless communication message between the wireless communications device and each of the plurality of target zone reference objects;
determine a measure of a signal power received from each of the plurality of target zone reference objects as received by the wireless communications device;
compare for each of the plurality of target zone reference objects, the calibration signal power with the corresponding measure of a signal power;
determine that the wireless communications device is in the target zone when the comparison establishes that the calibration signal power is less than the corresponding determined measure of a signal power for at least one of the plurality of target zone reference objects; and
control the environment in the target zone based on determining that the wireless communications device is in the target zone.

16. The computing system as recited in claim 15, wherein the computer-executable instructions that, when executed by the processor, further cause the computing system to:
determine that the wireless communications device is not occupying the target zone when the comparison establishes that the calibration signal power is greater than the corresponding determined measure of a signal power for each of the plurality of target zone reference objects;
retrieve previously determined occupancy information of the wireless communications device;
determine that the wireless communications device has exited the target zone when the retrieved previously determined occupancy information establishes that the wireless communications device was previously in the target zone and a determination that the wireless communications device is not in the target zone; and
control the environment based on the determination that the wireless communications device has exited the target zone.

17. The computing system as recited in claim 15, wherein the computer-executable instructions that, when executed by the processor, further cause the computing system to:
determine that the wireless communications device has entered the target zone for a sustained period of time; and
control the environment based on the determination that the wireless communications device has entered the target zone for a sustained period of time.

* * * * *